(12) United States Patent
Eian et al.

(10) Patent No.: US 7,277,599 B2
(45) Date of Patent: Oct. 2, 2007

(54) SYSTEM AND METHOD FOR THREE-DIMENSIONAL VIDEO IMAGING USING A SINGLE CAMERA

(75) Inventors: John Nicolas Eian, Minneapolis, MN (US); Richard E. Poppele, Minneapolis, MN (US)

(73) Assignee: Regents of the University of Minnesota, Saint Paul, MN (US)

( * ) Notice: Subject to any disclaimer, the term of this patent is extended or adjusted under 35 U.S.C. 154(b) by 737 days.

(21) Appl. No.: 10/669,085

(22) Filed: Sep. 23, 2003

(65) Prior Publication Data

US 2004/0114033 A1    Jun. 17, 2004

Related U.S. Application Data

(60) Provisional application No. 60/413,180, filed on Sep. 23, 2002.

(51) Int. Cl.
*G06K 9/36* (2006.01)
*G06K 9/00* (2006.01)
*H04N 13/02* (2006.01)

(52) U.S. Cl. .................. 382/285; 382/154

(58) Field of Classification Search ............ 382/285, 382/286, 293, 294, 295, 308, 276, 154, 100, 382/118; 348/49, 50, 46, 135; 345/419, 345/420, 424
See application file for complete search history.

(56) References Cited

U.S. PATENT DOCUMENTS

| 6,278,460 B1 * | 8/2001 | Myers et al. ............... 345/424 |
| 7,103,211 B1 * | 9/2006 | Medioni et al. ............ 382/154 |
| 2002/0110273 A1 * | 8/2002 | Dufour ....................... 382/154 |
| 2003/0206652 A1 * | 11/2003 | Nister ......................... 382/154 |

OTHER PUBLICATIONS

"Direct Linear Transformation from Comparator Coordinates into Object Space Coordinates in Close-Range Photogrammetry", by Y.I. Abdel-Aziz et al., for *Papers from the 1971 ASP Symposium on Close-range Photogrammetry*, pp. 1-19, dated 1971.

(Continued)

*Primary Examiner*—Yon J. Couso
(74) *Attorney, Agent, or Firm*—Fish & Richardson P.C.

(57) ABSTRACT

One aspect of this disclosure relates to a method for recovering the three-dimensional (3D) point geometry of an object from images acquired with a single camera. The present subject matter uses single-camera images, models generalized camera lines-of-sight outside the camera, and uses linkage distances between markers on an object and the modeled lines-of-sight to recover the 3D positions of markers on the object. The linkage distances are used to recover information about the third dimension that would otherwise be lost in single-camera two-dimensional images. Benefits include low-cost, simplicity, and ease of calibration and implementation, and further include the ability to estimate 3D distances and positions as accurately as with a commercially available multi-camera 3D system. Other aspects and embodiments are provided herein.

30 Claims, 12 Drawing Sheets

OTHER PUBLICATIONS

Bosco et al., "Reference Frames for Spinal Proprioception: Limb Endpoint Based or Joint-Level Based?," *J. Neurophysiol.*, 2000, 83:2931-2945.

Eian and Poppele, "A single-camera method for three-dimensional video imaging," *Journal of Neuroscience Methods*, 2002, 120:65-83.

Gard et al., "Two-Dimensional Representation of Three-Dimensional Pelvic Motion During Human Walking: An Example of How Projections Can Be Misleading," *J. Biomech.*, 1996, 29(10):1387-1391.

Miller et al., "A Technique for Obtaining Spatial Kinematic Parameters of Segments of Biomechanical Systems for Cinematographic Data," *J. Biomech.*, 1980, 13:535-547.

Orosz et al., "Correcting Two-Dimensional Kinematic Errors for Chick Embryonic Movements *In Ovo*," *Comput. Biol. Med.*, 1994, 24(4):305-314.

Shapiro, "An Overview of Techniques for Three-Dimensional Cinematography," *Proceedings of the Biomechanic Symposium*, Oct. 26-28, 1980, Indiana University, pp. 62-77.

Smith and Fewster, "Two-Dimensional Panning Algorithm for Wide Field Planar Motion," Paper presented at the *XVth Congress of the International Society of Biomechanics*, 1985, Finland: Jyvaskyla.

Yu et al., "A Panning DLT Procedure for Three-Dimensional Videography," *J. Biomech.*, 1993, 26(6):741-751.

* cited by examiner

SYSTEM AND METHOD FOR THREE-DIMENSIONAL VIDEO IMAGING USING A SINGLE CAMERA

CROSS-REFERENCE TO RELATED APPLICATION(S)

This application claims the benefit under 35 U.S.C. §119 (e) of U.S. Provisional Application Ser. No. 60/413,180 filed Sep. 23, 2002, the specification of which is hereby incorporated by reference.

TECHNICAL FIELD

This disclosure relates generally to systems and methods to perform three-dimensional imaging, and more particularly, to systems and methods to perform three-dimensional imaging using a single camera.

BACKGROUND

Video imaging is often used to record the three-dimensional (3D) geometry of objects in space. A number of different methods exist, and most make use of images acquired with multiple cameras. For example, the direct linear transformation method is a widely used technique because it is accurate and relatively simple to implement. The direct linear transformation requires images from at least two cameras for 3D reconstruction.

Occasionally, however, the use of multiple cameras is either impractical or too costly. A number of single-camera methods exist, but most record just two-dimensional (2D) geometry. A few single-camera methods for 3D data collection have been described. Each of these single-camera methods imposes the need for something in addition to the camera images. For example, one single-camera 3D application uses a mirror to provide a second view of the object so multi-image techniques could be applied to a single split image. Positioning the mirror is an evident drawback of this approach. This single-camera 3D method is an extension of a multi-camera 3D cinematographic method that applies to objects coupled by joints with known characteristics. This single-camera 3D method is an extension of a multi-camera 3D cinematographic method that applies to objects coupled by joints with known characteristics; however, the extraction is obtained as a least-squares solution to a linear approximation (1st order Taylor series) of complicated non-linear position equations, and is determined iteratively until the solution reaches a specified maximum change between iterations. Another single-camera 3D method uses linkage distances, but assumes parallel camera lines of sight, which is almost never true. Consequently, the reconstruction approximation is only valid in a restricted portion of space.

There is a need in the art to provide an improved system and method for performing three-dimensional imaging using a single camera to reduce equipment cost, to reduce equipment complexity for simpler integration, and to reduce required views of the object.

SUMMARY

The above mentioned problems are addressed and will be understood by reading and studying this specification. This application discusses a method to recover three-dimensional (3D) point geometry of an object from images acquired with a single-camera. Typically, multiple cameras are used to record 3D geometry. Occasionally, however, there is a need to record 3D geometry when the use of multiple cameras is either too costly or impractical. The present subject matter uses single-camera images. Additionally, each marker on the object is linked to at least one other marker by a known distance. The linkage distances are used to recover information about the third dimension that would otherwise be lost in single-camera two-dimensional images. Benefits of the present subject matter include the low-cost, simplicity, and ease of calibration and implementation, and further include the ability to estimate 3D distances and positions as accurately as with a commercially available multi-camera 3D system.

The present subject matter can be used to determine the positions of multiple markers in space when each marker is linked to at least one other marker by a known, but potentially variable, distance. The linkage distances are used to recover information about the third dimension that would otherwise be acquired with a second camera. Numerous objects possess the geometry required for this approach. For example, joint markers on a limb suffice because the lengths of the bones that span the joints provide the required linkage distances. One of ordinary skill in the art, upon reading and comprehending this disclosure, will be able to identify other objects that posses the geometry required for this approach.

The present subject matter is relatively simple and low cost. The only required equipment is one camera and a system capable of locating image points in a 2D plane. No measurements of camera position or orientation are needed. The required calibration is simple. The calibration involves recording still images of a marker grid moved incrementally through the depth of the object workspace.

Reconstruction accuracy depends primarily on the care taken in performing the calibration and the accuracy of the imaging system. In the study described in this disclosure, 3D lengths and positions were able to be estimated as accurately as with a commercially available multi-camera 3D system— with a marked reduction in system complexity and cost. This method seems well suited for pilot studies to determine whether a standard single-camera 2D system or a more expensive multi-camera 3D system is needed. It may also serve as a simple low-cost alternative when the imaged objects meet the linkage requirement.

The present subject matter models the true perspective of the camera lines of sight, and formulates the non-linear position equations for which a relatively simple analytical solution exits such that the solution is exact rather than iterative. One way to recover markers on an object from single-camera 2D images is to use knowledge of some linkage-distances between the markers on the object in addition to the images. The 2D images are used to determined specific camera lines-of sight that contain the object markers, and the linkage-distances between the markers are used to reduce these possible positions from somewhere along a line to a particular point in space. This idea is capable of being modeled geometrically, and the geometric model is capable of being described by mathematical equations. These equations allow the 3D positions of markers on an object to be determined from solutions of the equations. The solutions are unique given some linkage distances between markers on the object and the 2D video images.

In general, the camera lines-of-sight are modeled with equations that provide two of the line-of-sight coordinates, X and Y, as a function of the third coordinate, Z. The equations and discussion that follow in this section is intended as an example to assist the reader with understanding the disclosure provided in the Detailed Description, and thus should not be read to limit the present subject matter.

A particular line-of-sight is specified by a location in the 2D image plane (u,v).

$$X=(aZ+b)u$$

$$Y=(aZ+b)v$$

where a and b are parameters determined from a camera calibration, and u and v are known locations in the 2D image plane of the camera. The points u,v dictate the orientation of a particular line-of sight in 3D space, and Z is a variable spatial coordinate along a particular line-of-sight. The equations provide the remaining two line-of-sight coordinates, X and Y, given Z.

Once the lines-of-sight containing the markers are determined from the image, the linkage-distances are used to position the markers along these lines. Consider, for example, two markers in space, O and P, separated by a known linkage-distance, $\Delta$. Suppose the position of O in space is known, $(X_O, Y_O, Z_O)$, and the position of P is unknown, $(X_P, Y_P, Z_P)$. From the distance formula we have:

$$\Delta^2 = (X_O - X_P)^2 + (Y_O - Y_P)^2 + (Z_O - Z_P)^2.$$

Using an image of the points, unknown spatial coordinates $X_P$ and $Y_P$ are replaced with their respective line-of-sight equations described previously: $X_P = (aZ_P + b)u_P$ and $Y_P = (aZ_P + b)v_P$. Then the distance formula relating O to P is $$\Delta^2 = (X_O - (aZ_P + b)u_P)^2 + (Y_O - (aZ_P + b)v_P)^2 + (Z_O - Z_P)^2.$$

In this equation, $Z_P$ is the only unknown, so $Z_P$ can be determined. There are two solutions, one of which is eliminated by considering additional point(s) on the object. With $Z_P$ determined, the line-of-sight equations provide $X_P$ and $Y_P$:

$$X_P = (aZ_P + b)u_P \text{ and } Y_P = (aZ_P + b)v_P.$$

The 3D position of one marker on an object is determined using a known 3D position of another marker, the linkage-distance between the two markers, and an image. The method thus requires knowledge of the 3D position of a seeding marker to initiate the 3D reconstruction. The seeding position can be determined from knowledge of one spatial coordinate and an image, or from three linked markers and an image of an object showing the three linked markers.

One aspect of this disclosure relates to a method for recording three-dimensional (3D) point geometry of an object using a single camera. In various embodiments, the method includes identifying a number of markers on the object, knowing a linkage distance between the marker and at least one other marker for each marker in the number of markers, capturing two-dimensional (2D) information for the object using a single camera where the 2D information includes at least some of the number of markers on the object, modeling camera lines-of-sight that in general may be divergent, convergent or parallel, herein referred to as generalized camera lines-of-sight, and using the linkage distance and the modeled generalized camera lines to recover third dimension information for the object.

One aspect of this disclosure relates to a three-dimensional (3D) video imaging system. In various embodiments, the system comprises a single camera to capture a two-dimensional image (2D) of an object where the 2D image of the object includes a number of markers, a memory to store a linkage distance from each of the number of markers to at least one other marker, to store a spatial coordinate of a seeding marker and to store a mathematical model of generalized camera lines-of-sight, and a processor to process the 2D image and the linkage distance for each of the number of markers to provide 3D information of the object using the mathematical model. Although a computerized imaging system similar to that described above would typically be used in conjunction with this method to speed 3D reconstruction, such a system is not necessary. For example, this method could be applied by hand to photographic images using a ruler and a pencil and paper to compute the 3D reconstruction equations, or with various degreed of tools somewhere between hand calculations and a fully computerized reconstruction system.

This Summary is an overview of some of the teachings of the present application and not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description refers to the accompanying drawings which show, by way of illustration, specific aspects and embodiments in which the present invention may be practiced. The various embodiments are not necessarily mutually exclusive as aspects of one embodiment can be combined with aspects of another embodiment. References to "an", "one", or "various" embodiments in this disclosure are not necessarily to the same embodiment, and such references contemplate more than one embodiment. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

The inventors J. Eian and R. E. Poppele published the following paper: "A Single-Camera Method for Three-Dimensional Video Imaging," Journal of Neuroscience Methods 120 (2002) 65–83, which is herein incorporated by reference in its entirety.

Figure 1:
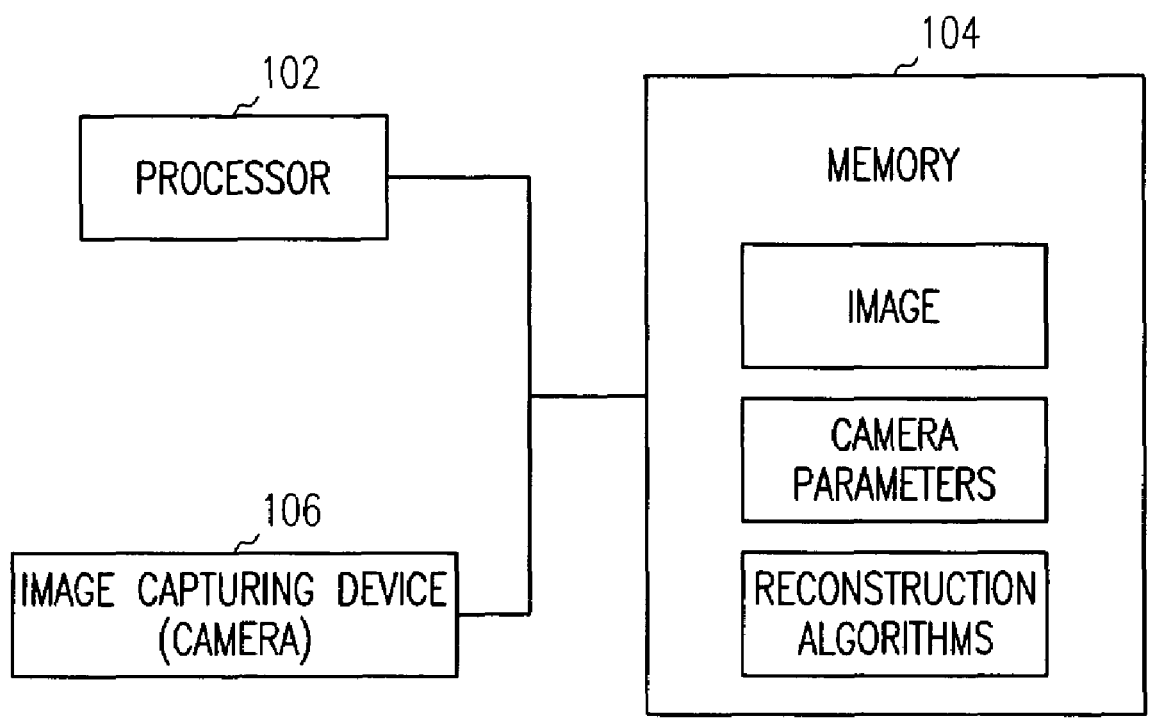
FIG. 1 illustrates a system according to various embodiments of the present subject matter.

FIG. 1 illustrates a system according to various embodiments of the present subject matter. The present subject matter reconstructs 3D positions of points on objects from single-camera 2D images and linkage distances. Various embodiments of the system 100 include a processor 102 connected to memory 104. Various embodiments of the system 100 further include an image capturing device, such as a still and/or video camera 106. The memory includes image data, camera parameters, and computer instructions representing reconstruction algorithms. The algorithms of the present subject matter are performed by the processor operating on computer instructions stored in the memory. In various embodiments, the system includes 2D images previously captured using a camera whose generalized lines-of-sight are determined from a calibration. The illustrated processor, memory and camera are capable of communicating with each other to appropriately perform the processes described within this disclosure. Note that although such a system would afford fast 3D reconstruction with this method, it is not required to employ this method.

Figure 2A:
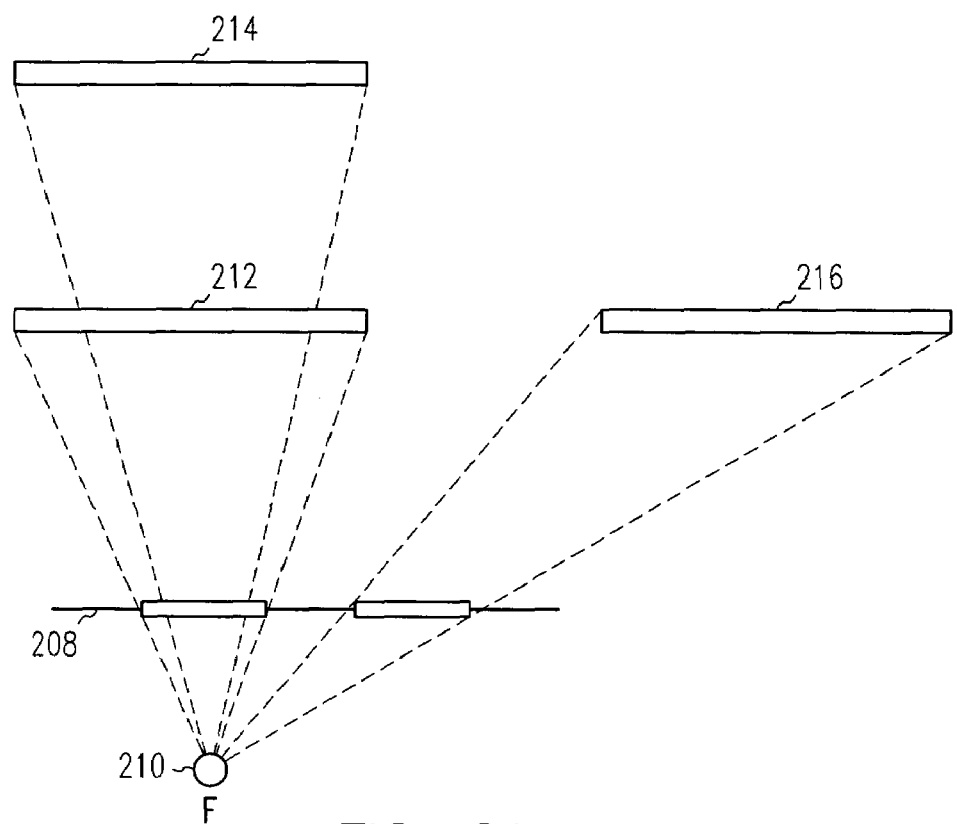
FIGS. 2A and 2B illustrate a top view of a camera focus and image plane, and further illustrate translation distortions and rotation distortions, respectively.
Figure 2B:
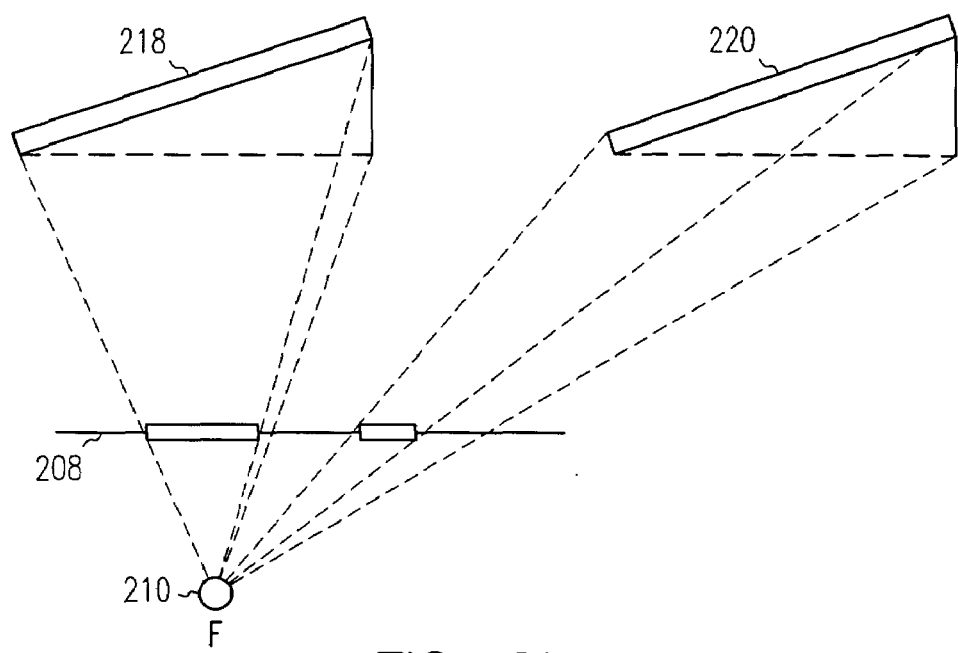

When 2D images from a single camera are used to record the 3D point geometry of an object, information along one of the three dimensions is lost. The lost information is difficult to recover because changes in the object's 3D position and orientation cause confounding changes in its 2D image. FIGS. 2A and 2B illustrate a top view of a camera focus and image plane, and further illustrate translation distortions and rotation distortions, respectively. Each of the figures includes a representation of a camera image plane 208 and a focal point 210 used to model a divergent case of generalized camera lines of sight. In FIG. 2A, an object of a given size is illustrated in a first position 212, which corresponds to a first image length of a first size on the image plane based on the lines-of-sight converging to the focal point. When the object is moved from the first position further away from the image plane into a second position 214, the corresponding second image length on the image plane has a second size that is smaller than the first image length. When the object is moved parallel to the image plane from the first position to a third position 216, however, the corresponding image length on the image plane does not change so long as the orientation of the bar remains fixed (but compare to rotations in FIG. 2B 218, 220). The figure illustrates that translations along depth cause changes in the image lengths on the image plane. In FIG. 2B, an object of a given size is illustrated in a first position with a first rotational position 218, and is further illustrated in a second position with a second rotational position 220. The image lengths for the objects in the first position, the rotated first position, the second position, and the rotated second position are illustrated in the image plane. The figure illustrates that rotations cause position dependent changes in the image lengths.

Figure 3:
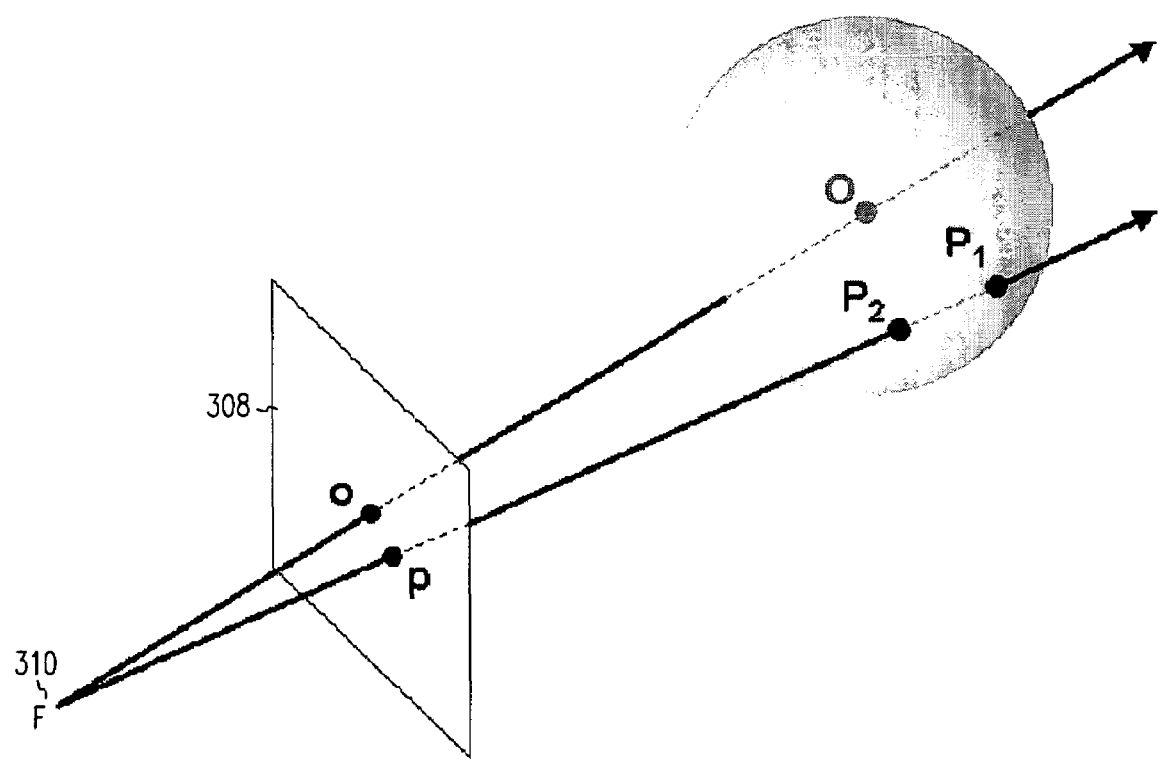
FIG. 3 illustrates geometry for the reconstruction algorithm, according to various embodiments of the present subject matter.

FIG. 3 illustrates geometry for the reconstruction algorithm, according to various embodiments of the present subject matter. The figure includes representations for the image plane 308 and a focal point 310 used to model generalized camera lines-of-sight. In order to see how distance information can be used to reconstruct 3D geometry from a single 2D image, a two-point example is given. Consider a point O arbitrarily positioned in space, and a second point, P, linked to O by a known distance, $\Delta$. The position of P relative to O is determined using A and an image of this geometry. Referring to FIG. 3, the image on the image plane contains two points, o and p, generated by the points in space O and P, respectively. The location of p in the image specifies the camera line of sight that must contain P. The problem of locating P in 3D space amounts to determining where P lies along this line of sight. This is narrowed down to two possible positions by visualizing a spherical shell with radius $\Delta$ centered about the point in space O. The shell represents all possible positions of P relative to O. The line of sight specified by p can intersect this shell at most twice ($P_1$ and $P_2$), and these two intersections are the only possible positions of P relative to O given the image data. The actual position of P relative to O is determined by considering either known characteristics of the geometry (for example, of an object represented by the points), or, more generally, a third point linked to P. In the latter case, the distance from P to the third point will usually be satisfied by only one of positions $P_1$ and $P_2$. The geometry illustrated in FIG. 3 is the basis of the reconstruction algorithm of the present subject matter. A mathematical model of the geometry is provided in this disclosure.

The reconstruction algorithm requires a calibration that allows a generalized camera line of sight to be assigned to each location in the image. Each line of sight is the ray that contains all points in space that appear at a particular location in the image. The use of rays allows us to express all three unknown coordinates of an image producing point in terms of a single unknown coordinate. This coordinate reducing property of the rays in the algorithm is illustrated in the example provided above with respect to FIG. 3. Analogous to the shell about O, a 3D Euclidean distance formula is used to express the distance between O and P in terms of their three unknown coordinates. The image on the camera image plane contains points o and p, and their locations specify rays from the focus point through the image plane points o and p. These rays contain the object points O and P, respectively. Using equations that model these rays, all three unknown coordinates of O and P are expressed in terms of one unknown coordinate for each point. By substituting these equations into the distance formula, the distance formula is reduced to an equation with only two unknowns: one coordinate for O and one coordinate for P. Knowing the coordinate for one point, O for example, allows the coordinate of the other point to be solved.

Thus, the algorithm requires, in addition to the known distances between markers, one spatial coordinate of a seeding marker. The 3D positions of all the markers linked to the seeding marker are capable of being determined through chains of known distances. There are at least two ways to determine a coordinate for a seeding marker. One way is to know one coordinate of a marker beforehand. In a robotic system, for example, knowledge of the robot path provides knowledge of a coordinate for a marker affixed to the robot. Given this known coordinate, the equations for the ray that contains the marker specify the other two coordinates. Another way, which can be used if no coordinate of any marker is known, involves a triangle of distances between three markers and an image of the markers.

The object or subject is that which is being imaged. A finite set of points on the object is used to describe its geometry. These points are referred to herein as markers. Two markers are said to be "linked" when the distance between them on the object can be determined without using the images; for example, the distance may be measured prior to imaging or somehow monitored during imaging. The markers and their images are used to represent the geometry of the object in the following three domains: (1) 3D space, (2) 2D image plane, and (3) 2D video frame.

The first domain, 3D space or simply space, is the field of view of the camera. The object is assumed to always be in 3D space. Any three orthogonal directions, X, Y, and Z, are selected as a basis for 3D space. In the descriptions that follow it is assumed that the X direction is represented as the horizontal direction, the Y direction is represented as the vertical direction, and the Z direction is represented along the optical axis of the camera. The units of length in space are (cm), although other units of length can be used. O is denoted to be the origin in 3D space and the position of a point P is denoted in terms of the $\{O; X, Y, Z\}$ coordinate system by $(X_P, Y_P, Z_P)$. Although the orientation of the spatial coordinate directions is selectable, the position of O is not as its position is determined from the calibration.

The generalized camera lines-of-sight are modeled by assuming the camera focuses 3D space onto the 2D image plane. The focal point is denoted by F in portions of this disclosure. For each point p in the image plane, the ray that originates at F and contains point p is denoted as $R_p$. A ray, such as $R_P$, is referred to herein as a line of sight or camera line of sight. It contains all the points in space that could have produced an image at p; it is the inverse image of p. For simplicity, any bending of the rays by the lens is ignored and it is assumed that the image is not flipped. This does not change the analysis because a unique camera line of sight outside the camera is associated with each point in the image plane. The origin in the image plane is denoted by o and the coordinate directions are denoted by u and v. The calibration results are used to locate o and determine the orientations of u and v. The location of a point p in the image plane under the $\{o; u, v\}$ coordinate system is denoted by $(u_p, v_p)$. Unless otherwise stated image locations are always given using the $\{o; u, v\}$ coordinate system.

Figure 4:
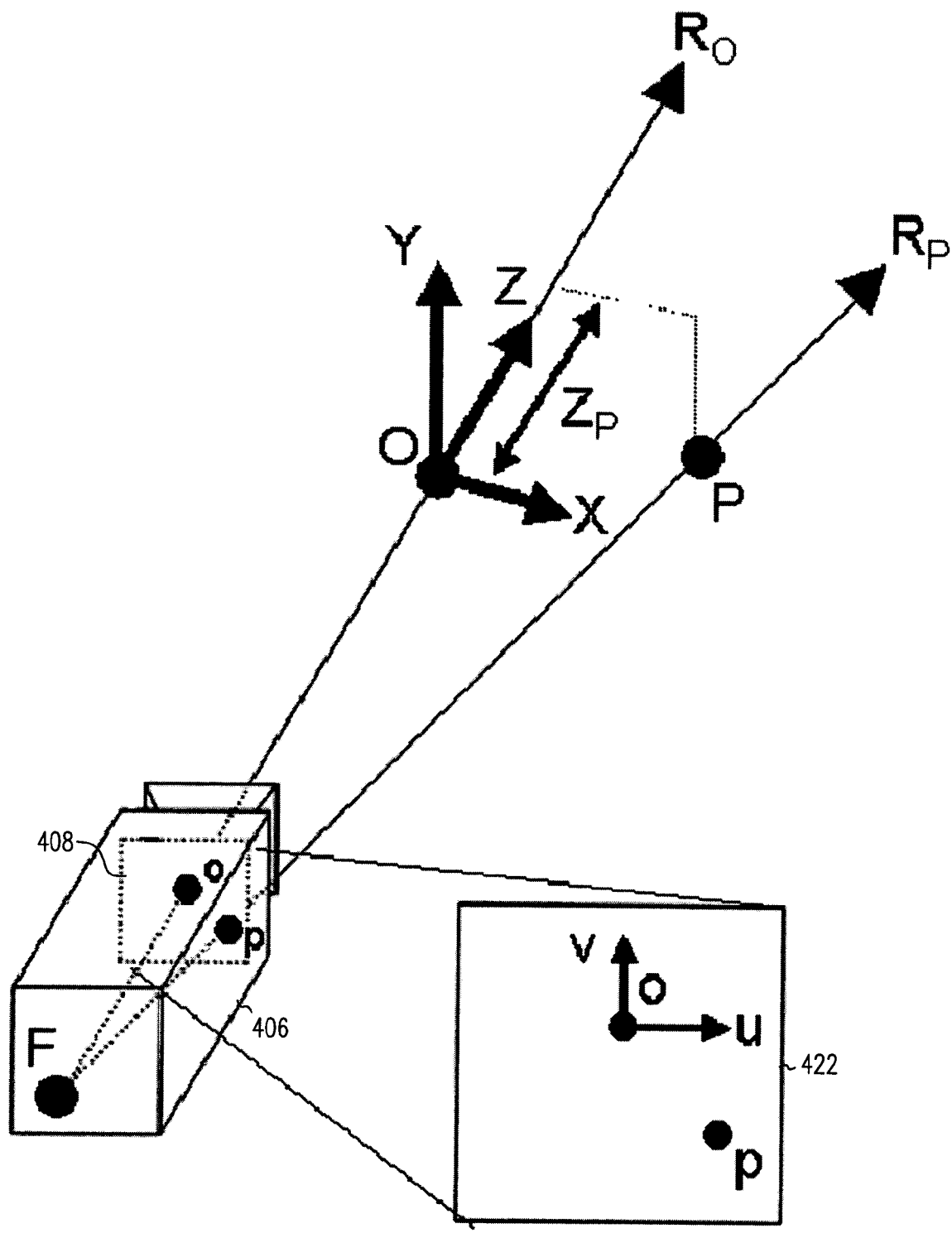
FIG. 4 illustrates dilation mapping, according to various embodiments of the present subject matter.

FIG. 4 illustrates the "dilation mapping", according to various embodiments of the present subject matter. Point O is the origin in 3D space and is contained by camera line of sight $R_O$. Point P in 3D space has position $(X_P, Y_P, Z_P)$ and is contained by line of sight $R_P$. $R_O$ and $R_P$ appear in the image plane as points o and p, respectively. Point o is the image plane origin and p is located at $(u_p, v_p)$. The camera 406 provides 2D video frames 422 for viewing, which are scaled versions of the image plane 408 at fixed instances in time. Thus, in general a "video frame" can be produced by any imaging device. The dilation mapping provides (X, Y) in space given Z in space and (u, v) in the image plane: the location of the image of a point P, $(u_p, v_p)$, specifies line of sight $R_P$ that must contain P, and then $Z_P$ specifies $(X_P, Y_P)$ along $R_P$.

The camera provides 2D images, such as video frames, for viewing. A video frame is just a scaled version of the image plane at a fixed instant in time. Thus, the same labels are used for corresponding entities in a video frame or the image plane. A difference between the two is that in practice, the image plane locations are determined from video frames. Consequently, locations given in a coordinate system specific to the video frame are transformed into the $\{o; u, v\}$ coordinate system of the image plane for 3D reconstruction. The units of length from the video frame for the $\{o; u, v\}$ coordinate system are used, but are expressed as dimensionless quantities since the units are specific to the video equipment.

Throughout this disclosure, upper case text is used for 3D space (X, Y, Z) and lower case text is used for images (u, v). Furthermore, entities are said to be positioned in space, whereas their images are said to be located in the image plane or a video frame.

The reconstruction is based on the premise that the 3D position of a point in space can be determined given its 2D image coordinates (u, v) and its Z position in space. Consider an arbitrary point O in 3D space that generates an image o in the image plane. Given the depth of O in space, $Z_O$, the remaining coordinates of O can be determined because camera line of sight $R_o$ contains only one point with Z coordinate $Z_O$. This idea is generally represented with a mapping:

$$D: (u, v, Z) \rightarrow (X, Y).$$

D is referred to as the dilation mapping. Here u and v are the image plane coordinates of an image point. They specify the camera line of sight containing all points in space that could have generated an image at that location. The Z coordinate makes the point that produced the image unique within the line of sight. The remaining spatial coordinates are X and Y. The dilation mapping can be expressed in terms of its scalar components for X and Y.

$$D_X: (u,v,Z) \rightarrow X$$

$$D_Y: (u,v,Z) \rightarrow Y.$$

The realizations of these mappings are determined from the calibration results as described within this specification. For now, the dilation formulas are provided with the following general functions:

$$X = D_X(u,v,Z)$$

$$Y = D_Y(u,v,Z). \tag{1}$$

The dilation formulas model the camera optics and are the essence of the reconstruction algorithm. They provide (X, Y) positions as a function of Z given a camera line of sight specified by an image location (u, v). They allow the combination of linkage distances with 2D images so 3D information can be recovered. For example, the Z coordinate of a point P at unknown position $(X_P, Y_P, Z_P)$ can be determined with the following three pieces of information: (1) the position of a point O in space, $(X_O, Y_O, Z_O)$; (2) the linkage distance between O and P, $\Delta_{OP}$; and (3) the location of the image of P in the image plane, $(u_P, v_P)$. The 3D Euclidean distance formula relating O to P is solved for $Z_P$ after eliminating unknowns $X_P$ and $Y_P$. $X_P$ and $Y_P$ are eliminated by replacing them with their respective dilation formulas, $X_P = D_X(u_P, v_P, Z_P)$ and $Y_P = D_Y(u_P, v_P, Z_P)$.

Let O and P have unknown spatial positions, $(X_O, Y_O, Z_O)$ and $(X_P, Y_P, Z_P)$, respectively, and let O and P be linked by a known distance $\Delta_{OP}$ (measured prior to imaging or known some other way). Let the images of O and P be o and p, respectively, with image plane locations $(u_O, v_O)$ and $(u_P, v_P)$ determined from a video frame.

From the 3D Euclidean distance formula:

$$\Delta_{OP} = \sqrt{(X_O - X_P)^2 + (Y_O - Y_P)^2 + (Z_O - Z_P)^2}.$$

Now, suppose that $Z_O$ is known, making O the 'seeding marker'. Equation 1 can be used to determine $X_O$ and $Y_O$ given $Z_O$ and the location of the image of O, $(u_O, v_O)$. Equation 2 can be rewritten with $X_P$ and $Y_P$ replaced with their respective dilation formula components from Equation 1:

$$\Delta_{OP} = \sqrt{\begin{array}{c}(X_o - D_X(u_P, v_P, Z_P))^2 + \\ (Y_O - D_Y(u_P, v_P, Z_P))^2 + (Z_O - Z_P)^2\end{array}}. \quad (3)$$

In Equation 3, $Z_P$ is the only unknown. Indeed, $Z_O$ is assumed for the moment; $X_O$ and $Y_O$ are determined from $u_O$, $v_O$ and $Z_O$ using Equation 1; $\Delta_{OP}$ is the known linkage distance; and $u_P$ and $v_P$ are the image plane coordinates for p. Equation 3 is solved for $Z_P$, and $Z_P$, $u_P$ and $v_P$ in Equation 1 are used to determine $X_P$ and $Y_P$. With the 3D coordinates of P determined, the procedure just described is used to compute the 3D coordinates of any point linked to P, and so on.

Implementations of this general solution are described below in sections entitled Calibration, Parameterized Dilation Formulas, and Seeding Markers. Calibration provides the data used to establish the image plane coordinate system, {o; u, v}, and the data to realize the dilation formulas (Equation 1). Although these formulas may be determined from the calibration data alone, they can also be derived by considering the geometry of the camera set-up. In the section entitled Parameterized Dilation Formulas, formulas are derived for a widely applicable camera geometry, which can be incorporated into Equation 3 and solved for the unknown depth (i.e. for $Z_P$ above). In that case the calibration data is used to determine the parameters. In the section entitled Seeding Markers, methods for determining a spatial coordinate for a seeding marker are described.

In various method embodiments of the present subject matter, the calibration data is acquired after defining a 3D coordinate system in the object workspace by recording still images of a grid of markers moved incrementally throughout the depth of the workspace. These images are used to determine the image plane coordinate system {o; u, v}, and are also used to ascertain realizations for the general reconstruction formulas (Equations 1 and 3). Although not necessary in general, parameterized realization formulas based on geometric considerations are derived. A 3D reconstruction is performed by first determining the Z position of a 'seeding marker' on the object, computing the (X, Y) coordinates of the seeding marker given its Z coordinate and the location of its image relative to o in the image plane, (u, v), and solving Equation 3 to compute the Z position(s) of any marker(s) linked to the seeding marker. With the Z position(s) of the linked marker(s) computed, the process is repeated for the next linked marker(s).

Calibration

Calibration provides the data used to determine the image plane coordinate system, {o; u, v}, and the realizations of the reconstruction equations. The spatial directions (X,Y,Z) are selected before calibrating. Although the orientation of the spatial directions may be arbitrary, they are preferably oriented so the determination of the seeding marker is simple. For now, it is assumed that the spatial directions have been selected, and that the Z direction is the coordinate direction most nearly parallel to the optical axis of the camera. The spatial origin, O, is not defined beforehand, but rather is determined from the calibration to avoid additional transformations that would otherwise complicate the reconstruction formulas.

Calibration involves acquiring the data, determining the image plane coordinate system {o; u, v} and relating it to the spatial coordinates, determining the (X, Y) position of the calibration grid, deriving general or parameterized reconstruction formulas, and determining the reconstruction equations.

Acquiring the calibration data includes constructing a planar grid of markers, referred to herein as a calibration grid. Preferably, the grid spans the X-Y portion of the object workspace and contains enough markers for statistical estimation of the dilation formulas. Still images of the grid are acquired as it is moved incrementally along the Z direction throughout the depth of the object workspace. The incremental distances are measured and recorded. The grid is oriented normal to the Z direction and is moved only along the Z direction without changing its (X, Y) position. Small deviations are acceptable because they can be averaged out later (satisfactory results have been achieved with eyeball alignments).

The image plane coordinate system, {o; u, v}, is determined and connected with the spatial coordinate directions. The image plane origin, o, is identified as the image of the camera line of sight parallel to the Z direction in space. In other words, o is the image plane location that specifies the camera line of sight parallel to the Z direction. This line of sight is denoted by $R_o$. Since $R_o$ parallels the Z direction it has constant X and Y coordinates. X=0 and Y=0 are provided along $R_o$. The coordinate directions in 3D space are selectable, but the 0 coordinates are based on the calibration to avoid complicating the reconstruction formulas. Since X=Y=0 along $R_o$ it contains the origin in 3D space, O. Thus the image plane origin, o, is the image of the spatial origin, O, and this relationship allows convenient conversions of locations in the images to positions in 3D space. The Z=0 coordinate for O is defined by assigning one of the calibration images as acquired with the grid at Z=0. The u and v directions are defined as the images of the X=0 and Y=0 planes in space, respectively (it follows from the fact that o is the image of O that u and v will always be straight lines).

Figure 5A:
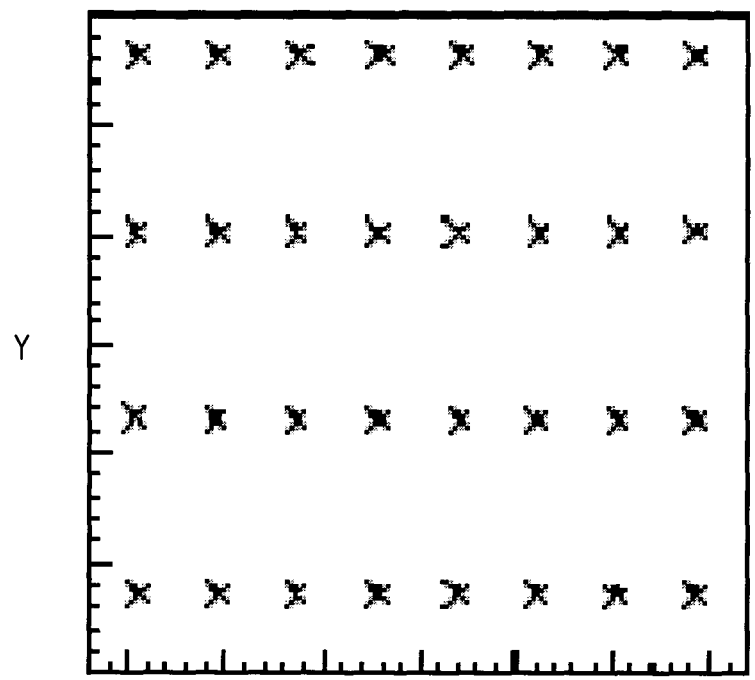
FIGS. 5A and 5B illustrate calibration and dilation formulas, according to various embodiments of the present subject matter.
Figure 5B:
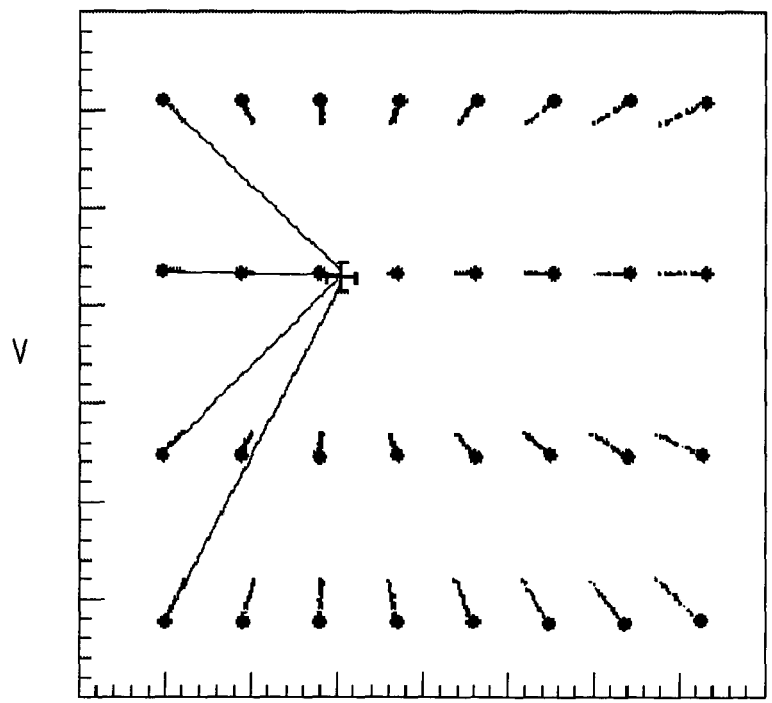

FIGS. 5A and 5B illustrate calibration and dilation formulas, according to various embodiments of the present subject matter. Point o in the image plane is located using the calibration grid images as illustrated in FIGS. 5A and 5B, which shows 12 images superimposed. The point images of the markers are grouped so all points in a group correspond to the same marker in the grid. It may be seen that the points in each group fall on a line, and that the lines intersect at the point to which the images converge. Since the grid is moved only along the Z direction, this convergence point is the image of the camera line of sight parallel to the Z direction. This point is by definition the location of the origin, o, for the {o; u, v} coordinate system.

One way of locating o statistically is by digitizing the calibration grid images, for example. This yields the locations of the markers in terms of the digitizer coordinate system. A straight line is fit to each group of points, and the digitizer coordinates of o are given by the location that best estimates the intersection of all these lines. All this is done in a least-squares sense.

However determined, the coordinates of o are needed to express locations in the images in terms of the {o; u, v} coordinate system. The locations of points in the image plane are expressed relative to o by subtracting from them the coordinates of o. Then, if necessary the coordinate directions are rotated so they parallel the u and v directions from {o; u, v}. We use the same lengths used to measure locations in the video frames for lengths in the {o; u, v} coordinate system. In this way we convert video frame locations into the {o; u, v} coordinate system for use with the 3D reconstruction algorithm.

The process involves determining the 3D positions (relative to the spatial origin, O) of the markers in the calibration grid when their images were recorded. These positions are not measured during calibration. Instead, they are determined as follows. One of the grid images is assigned as acquired at Z=0. In this way the Z=0 position of the 'seeding' marker is connected with the calibration data. The other Z positions of the grid are based on the incremental distances the grid was moved. The grid is oriented normal to the Z direction such that the Z positions of all the markers in each image are the same, which also keeps the (X,Y) positions constant. The (X, Y) positions of the markers are determined using the proportional locations of the marker images relative to the image plane origin, o, and the distances between adjacent markers in the grid. Suppose, for example, o is located ¼ of the way along the u direction between two images of markers separated by 4 cm along the X direction in the calibration grid. Then when the grid image was acquired, the two markers were positioned at X=−1 cm and +3 cm in space, respectively. To see why, consider FIG. 6 and these three facts: (1) by construction, $R_o$ parallels the Z direction and has constant (X, Y) coordinates (0, 0) in space; (2) o is the image of $R_o$ and (3) the calibration grid is always oriented normal to the Z direction. Therefore, the grid images scale radially about o as the Z position of the grid changes, and it follows that the proportionate locations of the marker images relative to o are independent of the Z position of the grid. The Y coordinate is approached in a similar fashion, and the distances between adjacent markers in the calibration grid (measured on the grid) are used to work outward from o and determine the (X, Y) positions of all the markers in the grid. Only one grid image is required for this since the (X, Y) position of the grid is held constant as it is imaged at various Z positions. Results from multiple images can be averaged to improve accuracy.

Figure 6:
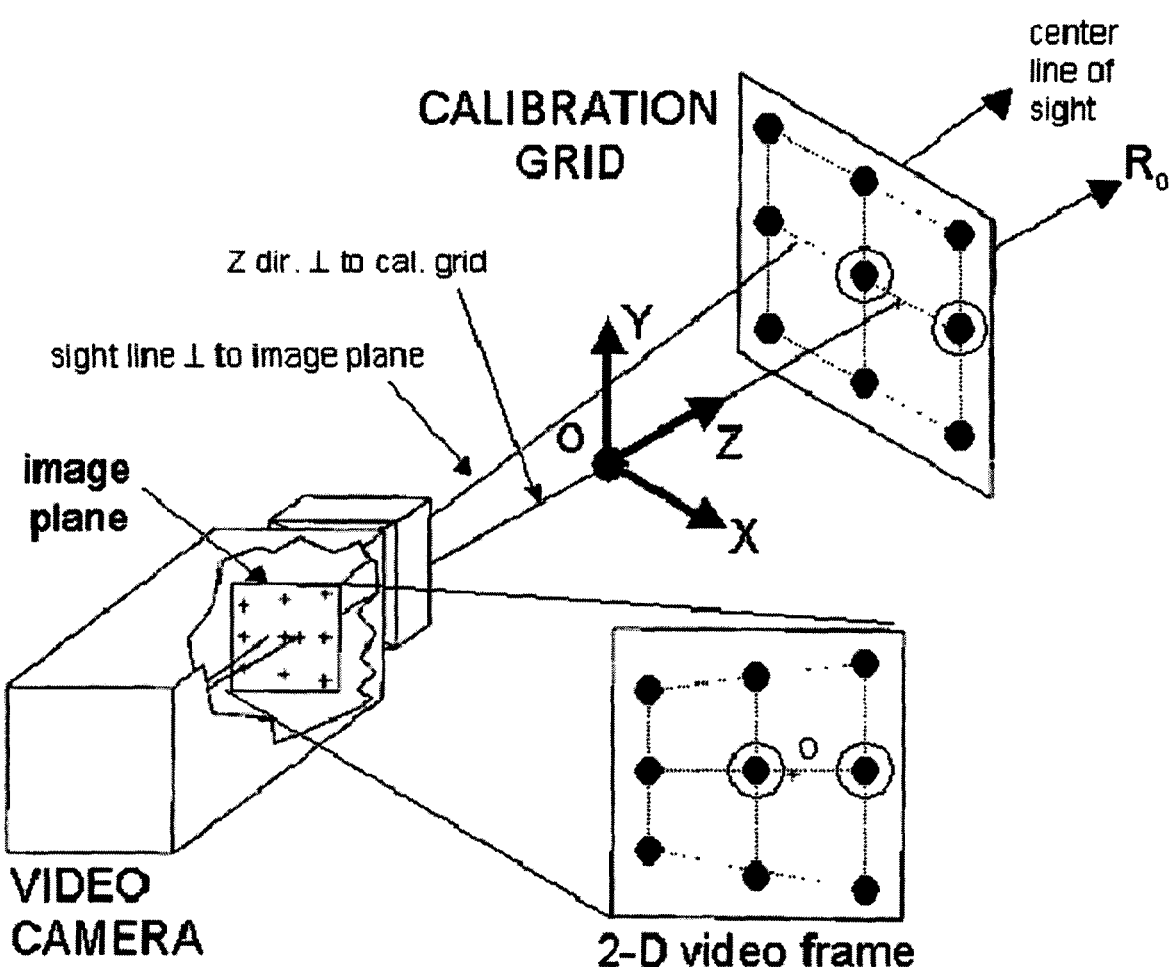
FIG. 6 illustrates determining grid marker (X, Y) positions from calibration images, according to various embodiments of the present subject matter.

FIG. 6 illustrates determining grid marker (X, Y) positions from calibration images, according to various embodiments of the present subject matter. In the example depicted in the figure the image plane origin (+) lies ¼ of the way from the left along the u direction between the two circled marker images. If we suppose in 3D space the two circled grid markers are separated by 4 cm along the X direction, it follows that they must have X positions of −1 cm and +3 cm relative to the spatial origin, O. See text for details. Note that this figure depicts the general calibration case where the optical axis of the camera is not parallel to the Z direction (i.e. not parallel with ray $R_O$). For the case depicted, this causes the markers to be closer together on the left side of the image.

Candidate dilation formulas are determined. First, the (u, v, Z) triplets for the dilation formula arguments Equation 1 are formed from the calibration data. The location of each marker image (in terms of the {o; u, v} coordinate system) is coupled with the Z position of the calibration grid when its image was acquired. The (u, v, Z) troplets are paired with the (X, Y) position of the marker that produced the image. The geometry of the camera set-up and/or the characteristics of the (u, v, Z)–(X, Y) pairs are used to ascertain candidate parameterized dilation formulas.

The candidate formula parameters are estimated using the (u, v, Z)–(X, Y) pairs (for example, minimizing over all triplets (u, v, Z) the sum of the squared errors between the actual (X, Y) position of each grid marker and those predicted by the candidate dilation formula). Determining candidate dilation formulas and estimating candidate formula parameters can be repeated until the simplest dilation formulas with a satisfactory fit to the (u, v, Z)–(X, Y) data are achieved.

Parameterized Dilation Formulas

Geometric considerations are used to derive parameterized realizations for the dilation formulas. This is done first for the case when the optical axis of the camera is parallel to the Z direction in space. We call this the aligned camera scenario. Presumably, it will often be possible to align the camera, so the corresponding dilation formulas will be widely applicable. This alignment need not be exact to achieve acceptable results.

Figure 7A:
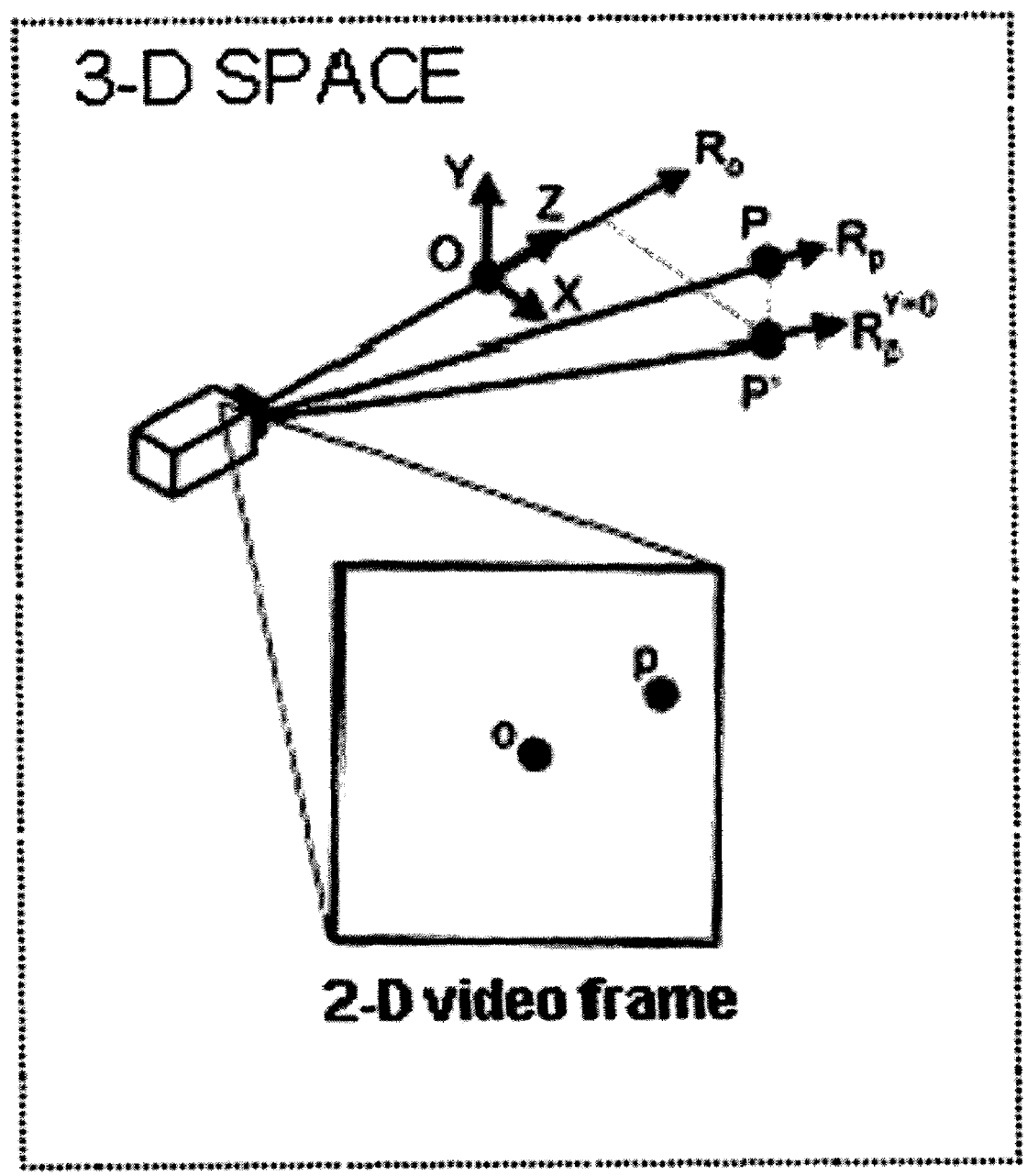
FIGS. 7A and 7B illustrate parameterized dilation formulas for an aligned camera scenario, according to various embodiments of the present subject matter.
Figure 7B:
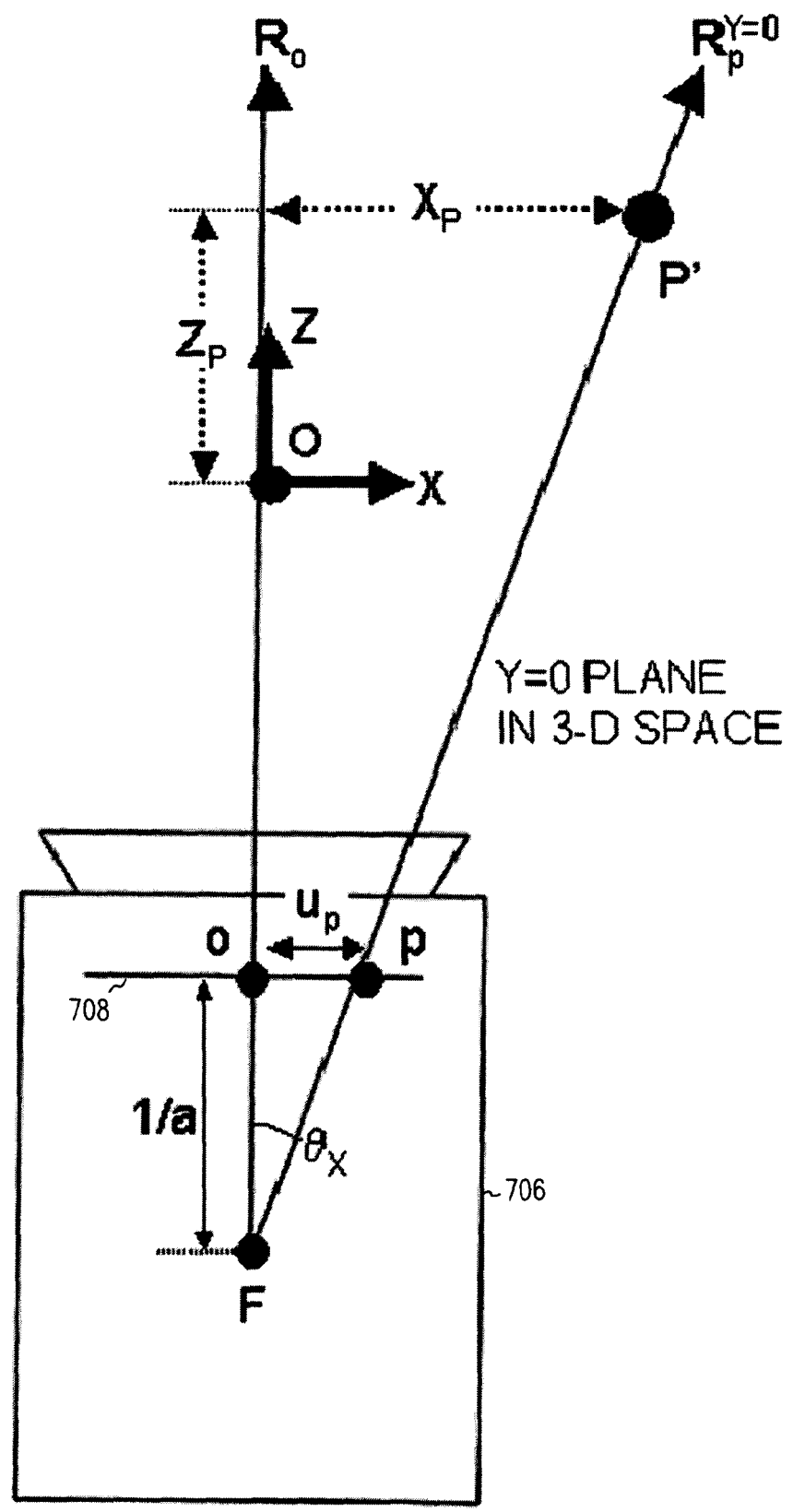

FIGS. 7A and 7B illustrate parameterized dilation formulas for an aligned camera scenario, according to various embodiments of the present subject matter. FIG. 7A shows the 3D scenario. In this case the camera 706 is aligned with the Z direction so $R_o$ is normal to the image plane 708. FIG. 7B is a downward view of the Y=0 plane in space, which is defined by rays $R_o$ and $R_P^{Y=0}$. Point P in 3D is space is positioned at $(X_P, Y_P, Z_P)$. Point P' is the projection of P into the Y=0 plane and has position $(X_P, 0, Z_P)$. Point p is the image of P in the image plane and has location $(u_p, v_p)$. The X position of both P and P' in space is $X_P$ and is given by $X_P = au_P(Z_P + b/a)$, where a and b are parameters determined from the calibration data and $au_p = \tan^{-1}(\theta_X)$, i.e. $au_p$ is the slope of $R_p^{Y=0}$ relative to $R_o$. $Y_P$ is derived similarly.

The dilation formulas provide (X, Y) given (u, v, Z), where (X, Y, Z) is a position in space that appears at location (u, v) in the image plane. The location of an arbitrary point p, $(u_p, v_p)$, in the image plane specifies a camera line of sight $R_p$ that contains P in space that generated p in the image. Given $R_p$, a model of how X and Y vary within $R_p$ as functions of Z is created. Based on the calibration, the image plan origin, o, specifies the camera line of sight with (X, Y) coordinates (X, Y)=(0, 0). The X and Y components of the dilation formulas are derived by using the slopes relative to $R_o$ of the projections of $R_p$ into the X=0 and Y=0 planes. X is determined by working in the Y=0 plane. The determination of Y in X=0 is identical because of the radial symmetry. In FIG. 7B, ray $R_p^{Y=0}$ is the projection of $R_p$ into the Y=0 plane. The slope of $R_p^{Y=0}$ relative to $R_o$ is denoted by $M_X$. For appropriately selected u* and z*:

$$M_x = \arctan(\theta_x) = \frac{u^*}{z^*} \quad (4)$$

$M_X$ preferably includes image data terms. The u coordinate of the location of p, $u_p$ in the image plane serves as the numerator (u*=$u_p$) in Equation 4 and the denominator z* is the distance between the focal point F and the image plane origin o. This distance is denoted by 1/a such that z*=1/a. From Equation 4, $$M_X = au_p. \quad (5)$$

The distance 1/a is used to model the optics of the camera (the generalized camera lines of sight) and is not known or measured directly. It is one of the dilation formula parameters determined from the calibration data. From FIG. 7B, $M_x$ and the distance along $R_o$ between F and P can be used to determine the distance along the X direction between P and $R_o$. Since by construction (1) $R_o$ parallels the Z direction and (2) X=0 along $R_o$, the latter distance is just the X-coordinate of P, $X_P$, and the former distance is along the Z direction, so it is denoted by $\Delta Z_{P,F}$. Thus $$X_P = M_X(\Delta Z_{P,F})$$

and after combining this with Equation 5, $$X_P = au_p(\Delta Z_{P,F}). \tag{6}$$

In Equation 6, $\Delta Z_{P,F}$ is expressed in terms of $Z_P$, the depth of P relative to the origin O. If b is a second parameter such that b/a is the distance between F and O, then $$\Delta Z_{P,F} = Z_P + \frac{b}{a}. \tag{7}$$

As with parameter a, parameter b is determined from the calibration data (and consequently, the actual position of O in space need not be measured). Combining Equations 6 and 7 yields $$X_P = \left(Z_P + \frac{b}{a}\right) au_p.$$

Moving parameter a inside the parenthesis and dropping the subscripts yields the final form of the X component of the dilation formulas:

$$X = u(aZ+b) = D_X(u,v,Z). \tag{8}$$

The Y component of the dilation formula is derived similarly, and we have $$Y = v(aZ+b) = D_Y(u,v,Z). \tag{9}$$

Both components share the same parameters a and b because of the radial symmetry that exists when the camera is aligned with the Z direction. Incorporating Equations 8 and 9 into the 3D Euclidean distance formula (Equation 2) yields:

$$\Delta_{1,2} = \sqrt{[X_1 - u_2(aZ_2 + b)]^2 + [Y_1 - v_2(aZ_2 + b)]^2 + [Z_1 - Z_2]^2}.$$

which is Equation 3 except with the dilation mappings (Equation 1) replaced with their parameterized realizations for the aligned scenario (Equations 8 and 9). The solution for $Z_2$ is $$Z_2 = \frac{Z_1 + a(X_1 u_2 - bu_2^2 + Y_1 v_2 - bv_2^2)}{1 + a^2(u_2^2 + v_2^2)} \pm$$

$$\sqrt{\frac{\{a(X_1 u_2 - bu_2^2 + Y_1 v_2 - bv_2^2) + Z_1\}^2 - \{1 + a^2(u_2^2 + v_2^2)\}}{\{X_1^2 - 2bX_1 u_2 + Y_1^2 - 2bY_1 v_2 + b^2(u_2^2 + v_2^2) - \Delta_{1,2}^2 + Z_1^2\}}{1 + a^2(u_2^2 + v_2^2)}}$$

By letting $$\alpha = a(X_1 u_2 - bu_2^2 + Y_1 v_2 - bv_2^2)$$

$$\beta = 1 + a^2(u_2^2 + v_2^2)$$

$$\chi = X_1^2 - 2bX_1 u_2 + Y_1^2 - 2bY_1 v_2 + b^2(u_2^2 + v_2^2)$$

$$Z_2 = \frac{Z_1 + \alpha \pm \sqrt{(\alpha + Z_1)^2 - \beta(\chi - \Delta_{1,2}^2 + Z_1^2)}}{\beta}. \tag{10}$$

Equations 8, 9, and 10 are the realizations of Equations 1 and 3 for the aligned camera scenario. They are used to reconstruct 3D positions just as described for the general setting, but with Equation 1 replaced by Equation 8 and 9, and with Equation 10 as the solution to Equation 3.

One problem with Equation 10 is that it provides two possible Z solutions (the $\pm\sqrt{}$). One way to eliminate the ambiguity is to know beforehand the relative Z position of the marker in question so the extraneous solution can be eliminated. If this is not possible, then both solutions can be kept until one is proven degenerate. For example, suppose there are two Z solutions, $Z_2$ and $Z_2'$, for some $P_2$. Then after using the dilation formulas (Equations 9 and 10 or in general Equation 1) there will be two possible positions for $P_2$: ($X_2$, $Y_2$, $Z_2$) and ($X'_2$, $Y'_2$, $Z'_2$). Both ($X_2$, $Y_2$, $Z_2$) and ($X'_2$, $Y'_2$, $Z'_2$) can be used in Equation 10 (or in general Equation 3) to compute $Z_3$ for another linked point $P_3$, and typically the incorrect position for $P_2$ will either (1) lead to an imaginary square root because $P_2$ and $P_3$ would be separated by a distance larger than $\Delta_{1,2}$, or (2) result in a depth position for $P_3$ that is obviously out of range.

It is possible to contrive scenarios where both solutions from Equation 10 are non-degenerate. (Consider the circle defined by one vertex of a triangle that is rotated about the axis defined by its other two vertices. Now, orient the triangle so the circle projects into a line in the image plane. Each interior point of the line represents two viable solutions.) In these instances, if it is critical that the correct position of the point in question is known, an additional observation is required. In general it may be that the optical axis of the camera cannot be aligned with the Z direction in space. We derive parameterized realizations of the dilation formulas for such a case here (realizations of Equation 1). The geometry is shown in the Y=0 plane in FIG. 8.

Figure 8:
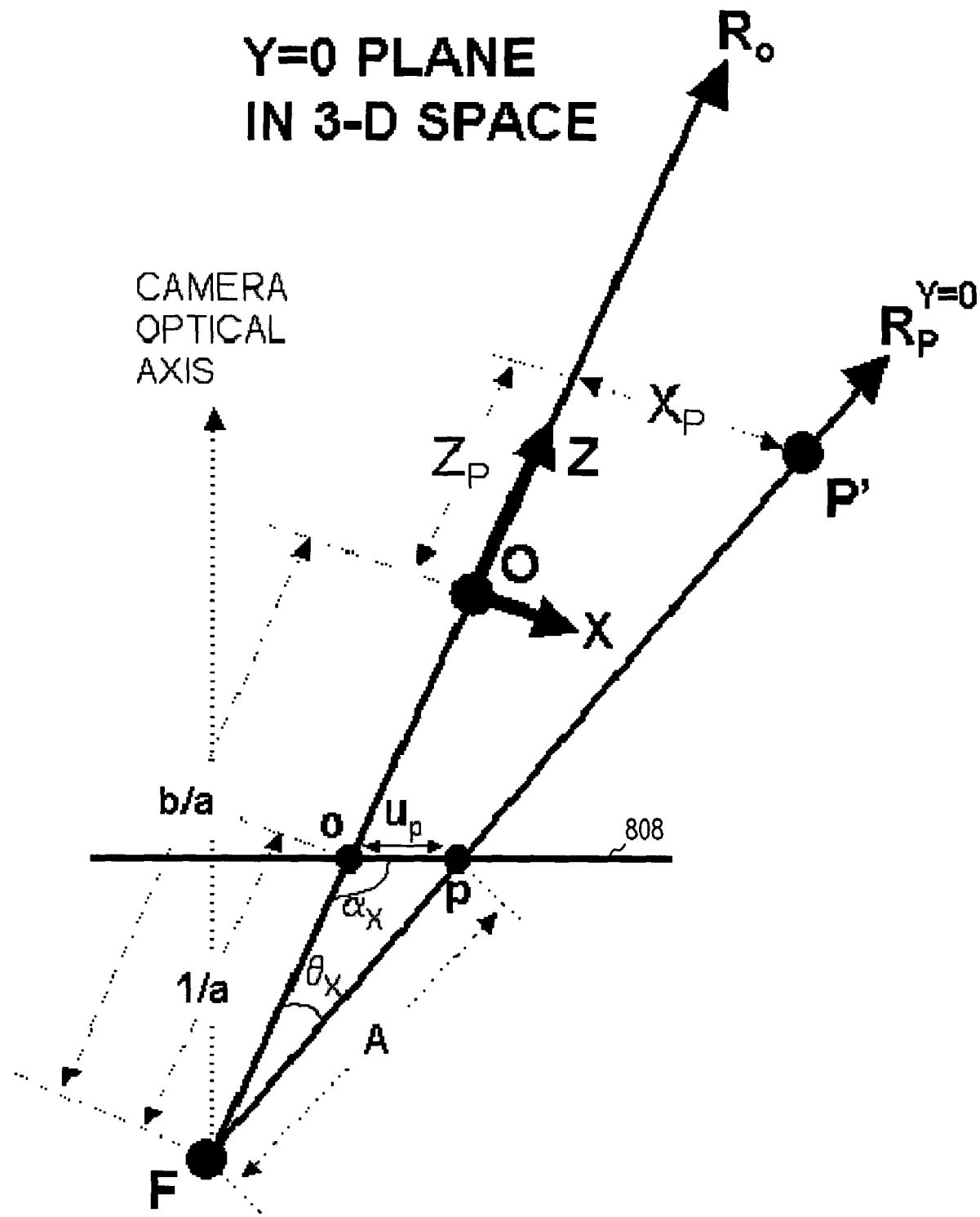
FIG. 8 illustrates general alignment parameterized dilation formulas, according to various embodiments of the present subject matter.

FIG. 8 illustrates general alignment parameterized dilation formulas, according to various embodiments of the present subject matter. The figure is a view of 3D space in the Y=0 plane, Y is out of the page. Point F is the focal point of the camera, O is the origin in 3D space, and o is the origin in the image plane 808. Point P is at an unknown position in space, ($X_P$, $Y_P$, $Z_P$), and is represented in the figure by its projection in the Y=0 plane, P' at ($X_P$, 0, $Z_P$). Point p is the image P, and p has a known location in the image plane, ($u_p$, $v_p$). Line of sight $R_o$ is specified by o and has coordinates (X, Y)=(0, 0) by construction. Ray $R_p^{Y=0}$ is the projection of the line of sight specified by p into the Y=0 plane. $\alpha_X$ is the angle between $R_o$ and $R_p^{Y=0}$. There are four parameters: parameter 1/a is the distance from F to o; parameter b is such that b/a is the distance from F to O; parameter $\alpha_Y$ is the angle $R_o$ makes with the image plane in the Y=0 plane; and parameter $\alpha_Y$ is the angle $R_o$ makes with the image plane in the X=0 plane. $\alpha_Y$ is not visible in the Y=0 plane depicted in the figure. A is the distance between F and p and is used only for the derivations.

In this case there are four parameters that must be determined from the calibration: a and b as in the aligned case, and additionally $\alpha_X$ and $\alpha_Y$. As before, 1/a models the distance between F and o and accounts for the optics of the lens. Parameter b is such that b/a is the distance between F and O; it accounts for the position of O relative to the camera along the Z direction. Parameters $\alpha_X$ and $\alpha_Y$ are the angles $R_o$ makes with the image plane in the Y=0 and X=0 planes, respectively, as illustrated in FIG. 8. In the aligned case $\alpha_X=\alpha_Y=90°$; now, $\alpha_X$ and $\alpha_Y$ are unknown parameters determined from the calibration.

As in the aligned case, the X-coordinate of a point P in space, $X_P$, is determined given its Z coordinate, $Z_P$, and the u-location of its image in the image plane, $u_p$. $Y_P$ is derived similarly by considering $Z_P$ and $v_p$. In the figure P is represented by its projection into the Y=0 plane, P'. Note the X-coordinates for P and P' are identical. To determine $X_P$ we use the projection into the Y=0 plane of the line of sight containing P, which we denote with ray $R_P^{Y=0}$. Recall that the image plane origin, o, was defined so the line of sight it specified, $R_o$, was parallel to the Z direction and had constant (X, Y) coordinates (0, 0). Thus, $X_P$ can be determined using the angle formed by $R_o$ and $R_P^{Y=0}$, denoted with $\theta_X$. If the parameters b/a are the distance between F and the spatial origin, O, then given $Z_P$ and $\theta_X$ we have $$X_P = \left(\frac{b}{a} + Z_P\right)\tan(\Theta_X). \quad (11)$$

Since $\theta_X$ is not directly available, we determine it using parameter $\alpha_X$ and the location of P in the image, $u_p$. From the cosine law we have $$A^2 = u_P^2 + \left(\frac{1}{a}\right)^2 - 2u_P\frac{1}{a}\cos(\alpha_X). \quad (12)$$

and also $$u_P^2 = \left(\frac{1}{a}\right)^2 + A^2 - 2\frac{1}{a}A\cos(\Theta_x). \quad (13)$$

Solving for $\theta_X$ yields $$\Theta_X = \arccos\left(\frac{u_P^2 - \left(\frac{1}{a}\right)^2 - A^2}{-2\left(\frac{1}{a}\right)A}\right). \quad (14)$$

Substituting Equation 12 for $A^2$ in Equation 14 yields:

$$\Theta_X = \arccos\left(\frac{\frac{1}{a} - 2u_p\cos(\alpha_X)}{A}\right). \quad (15)$$

Relative to angle $\theta_X$ in a right triangle, the adjacent leg is $1/a - 2u_p\cos(\alpha_X)$ and the hypotenuse is A. Therefore the opposite leg is $\{A^2 - [1/a - 2u_p\cos(\alpha_X)]^2\}^{1/2}$. From Equation 15, $$\tan(\Theta_X) = \frac{\sqrt{A^2 - \left[\frac{1}{a} - 2u_p\cos(\alpha_X)\right]^2}}{\frac{1}{a} - 2u_p\cos(\alpha_X)}. \quad (16)$$

Substituting Equation 12 for $A^2$ in Equation 16 and simplifying yields:

$$\tan(\Theta_X) = \frac{\sqrt{u_P^2 + 2u_P^2\frac{1}{a}\cos(\alpha_X) - 4u_P^2\cos^2(\alpha_X)}}{\frac{1}{a} - 2u_p\cos(\alpha_X)}. \quad (17)$$

Substituting Equation 17 for $\tan(\theta_X)$ in Equation 11 yields $$X_P = \left(\frac{b}{a} + Z_P\right)\frac{\sqrt{u_P^2 + 2u_P\frac{1}{a}\cos(\alpha_X) - 4u_P^2\cos^2(\alpha_X)}}{\frac{1}{a} - 2u_p\cos(\alpha_X)}. \quad (18)$$

Equation 18 provides $X_P$ given $Z_P$ and $u_p$; a, b, and $\alpha_X$ are the parameters determined from the calibration. However, referring to FIG. 8, $\alpha_X$ applies only when p is to the right of o, which would typically correspond to positive values of $u_p$. When p is to the left of o, corresponding to negative values in $u_p$, the derivation of $X_P$ of the same, except we must replace $\alpha_X$ by its complement, $180 - \alpha_X$. Using $\cos(180 - \alpha_X) = -\cos(\alpha_X)$, and considering the sign of $u_p$ for the two cases, and using Equation 18, $$X_P = \text{sign}(u_P)\left(\frac{b}{a} + Z_P\right)\frac{\sqrt{u_P^2 + 2u_P\frac{1}{a}\cos(\alpha_X) - 4u_P^2\cos^2(\alpha_X)}}{\frac{1}{a} - 2u_P\cos(\alpha_X)}. \quad (19)$$

which holds for both positive and negative values of $u_p$. $Y_P$ is similarly derived by considering the geometry in the X=0 plane. Although parameter $\alpha_X$ is replaced with $\alpha_Y$ when considering $Y_P$, parameters a and b do not change because they run along $R_o$, which is contained in both planes Y=0 and X=0 and therefore is unaffected by either projection. The result for $Y_P$ is $$Y_P = \text{sign}(v_P)\left(\frac{b}{a} + Z_P\right)\frac{\sqrt{v_P^2 + 2v_P\frac{1}{a}\cos(\alpha_Y) - 4v_P^2\cos^2(\alpha_Y)}}{\frac{1}{a} - 2v_P\cos(\alpha_Y)}. \quad (20)$$

Equations 19 and 20 are the parameterized realizations of the general dilation formulas described in Equation 1. Their parameters are determined from the calibration data. Once this is done the realizations are used in place of Equation 1, and reconstruction is carried out.

Note that when parameters $\alpha_X=\alpha_Y=90°$ as in the aligned case, the cosine terms in Equations 19 and 20 are zero, and Equations 19 and 20 reduce to the dilation formulas derived for the aligned case, Equations 8 and 9, respectively.

Seeding Markers

Two methods are described herein for determining the Z position of a seeding marker for use in the 3D reconstruction. Additionally, a scenario is provided where a seeding marker is not even required.

One method involves orientating the spatial coordinate system so the Z coordinate of one marker is known. This marker is the seeding marker. For example, when a marker remains within a plane or is affixed to an external device, it may be possible to orient the Z direction so the marker either maintains a constant Z position or moves along the Z direction in a known fashion. To determine the Z position it is necessary to know the distance along Z between one of the calibration grid positions and the marker during imaging. Then, if we define the aforementioned grid position as acquired with the grid at Z=0, the Z position of the marker is just its Z distance from the Z=0 grid position. A fixed point in space, with respect to which the Z position of the marker during imaging is known, can be used to link the Z positions of the marker and the calibration grid.

In general it may be that rather than the Z coordinate, the X or Y coordinate of a marker is known. Such a marker can still serve as the seeding marker, but there are added complications. Its Z coordinate can be determined from the triplet (u, v, X) or (u, v, Y), where u and v are its location in the images, and X or Y is known in space. To determine Z, the discussion of the dilation formulas is applied with Z replaced by either X or Y, whichever is the known coordinate. In this case one is computing (Y, Z) from (u, v, X), or (X, Z) from (u, v, Y), rather than (X, Y) from (u, v, Z). Note that when the X (Y) coordinate is the known coordinate, the Z coordinate cannot be computed whenever the seeding marker is in the X=0 (Y=0) plane because X=0 (Y=0) does not uniquely define Z.

Another method for determining a seeding Z position uses only object images and distances between linked markers. In contrast to the first method, connections between the seeding marker Z positions and calibration grid Z positions are not required. Any of the calibration grid images may be assigned as acquired with the grid at Z=0, and the Z position of the seeding marker can still be determined from the images alone. In this case the Z direction should be aligned with the camera's optical axis if possible so the dilation formula realizations in Equations 8 and 9 apply.

Three markers that form a triangle of known linkage distances are required. That is, for markers $P_1$, $P_2$, and $P_3$, the distances between $P_1$ and $P_2$, $\Delta_{1,2}$, $P_2$ and $P_3$, $\Delta_{2,3}$ and $P_3$ and $P_1$, $\Delta_{3,1}$, must be known (i.e. measured prior to imaging). We use Equation 2 three times, once for each of the three linkages. We substitute Equation 8 for all $X_j$ and Equation 9 for all $Y_j$, $1 \leq j \leq 3$, to arrive at a system of three equations and three unknowns. The unknowns are the $Z_j$:

$$\Delta_{1,2} = \sqrt{[u_1(aZ_1+b) - u_2(aZ_2+b)]^2 + [v_1(aZ_1+b) - v_2(aZ_2+b)]^2 + [Z_1 - Z_2]^2}$$

$$\Delta_{2,3} = \sqrt{[u_2(aZ_2+b) - u_3(aZ_3+b)]^2 + [v_2(aZ_2+b) - v_3(aZ_3+b)]^2 + [Z_2 - Z_3]^2}$$

$$\Delta_{3,1} = \sqrt{[u_3(aZ_3+b) - u_1(aZ_1+b)]^2 + [v_3(aZ_3+b) - v_1(aZ_1+b)]^2 + [Z_3 - Z_1]^2}$$

The $u_j$ and $v_j$ are the coordinates of the images of the $P_j$, and here a and b are the dilation formula parameters determined from the calibration. The solution for $Z_1$ in the first equation in terms of $Z_2$ is provided by Equation 10. Similarly, Equation 10 also provides the solution for $Z_3$ in the second equation in terms of $Z_2$. The solutions for $Z_1$ and $Z_3$ are substituted in the third equation, which can then be solved numerically for the single unknown, $Z_2$. If multiple solutions exist, the extraneous depths could be eliminated by repeating the procedure with additional triplets of markers that have only the marker in question in common.

A scenario is provided where there is no need to know a seeding marker Z position. This occurs when the distance between the camera and the object is large relative to the depth of the object-imaging region. In this case, the location of the image of a marker does not change as its Z position varies. In essence, the camera lines of sight are parallel within the object-imaging region and the need for the dilation formulas is eliminated. The 3D reconstruction problem reduces to a non-perspective 3D distance problem. The X and Y components of the dilation formulas become $X = D_X(u, v, Z) = cu$ and $Y = D_Y(u, v, Z) = cv$, where c is a constant (determined from the calibration data) that converts video frame lengths into spatial lengths, independent of Z (depth).

In this case, both a seeding marker, e.g. $P_1$, and its Z coordinate, $Z_1$, can be selected arbitrarily. The Z positions of all the reconstructed markers are given with respect to $Z_1$. Using the location of the seeding marker in the image plane, $(u_1, v_1)$, $X_1 = cu_1$ and $Y_1 = cv_1$. Therefore the 3D coordinates of the seeding marker are $(X_1, Y_1, Z_1) = (cu_1, cv_1, Z_1)$. For any marker linked to $P_1$ by a known distance, $\Delta_{1,2}$, its image location, $(u_2, v_2)$, are used to replace $X_2$ and $Y_2$ in Equation 2 with $X_2 = cu_2$ and $Y_2 = cv_2$:

$$\Delta_{1,2} = \sqrt{(X_1 - cu_2)^2 + (Y_1 - cv_2)^2 + (Z_1 - Z_2)^2}.$$

Above, $Z_2$ is the only unknown. The solution for $Z_2$ is:

$$Z_2 = Z_1 \pm \sqrt{\Delta_{1,2}^2 - X_1^2 + 2cX_1u_2 - c^2u_2^2 - Y_1^2 + 2cY_1v_2 - c^2v_2^2}. \quad (21)$$

The coordinates of the linked marker are $(X_2, Y_2, Z_2) = (cu_2, cv_2, Z_2)$. Equation 21 is Equation 10 with parameter a set to 0 (i.e. camera optic ignored) and parameter b replaced by c.

Testing

The following illustrates examples based on experiments performed by the inventors. As used in this portion of the disclosure, the term "we" refers to the originally listed inventors of this disclosure. We acquired images of objects moved through cyclic paths by a small robot (Microbot® alpha II+). We identified linked points on the objects, i.e. points separated by known fixed distances, and attached flat circular reflective markers to each of these points (3M reflective tape, 6 mm diameter). We used our algorithm to reconstruct the 3D positions of the markers from images of the markers and the distances between them on the object.

FIGS. 9A–9D illustrate test objects and subjects. We tested the algorithm under two conditions. The first, case A illustrated in FIG. 9A, involved a rigid object whose point geometry was designated by four markers, A, B, C, and D. We measured various geometric aspects of the object designated by the markers (angles, lengths and relative positions) and compared them with analogous aspects reconstructed from images recorded while the object was moved.

The robot moved the object through a nearly elliptical path (FIG. 9B), with major and minor axis of 18.2 and 2.4 cm along the horizontal and vertical, respectively. There was also a slight curvature in the path that caused the robot to deviate outside the vertical plane defined by the major and minor axes. At the endpoints of the major axis the robot endpoint was approximately 0.2 cm outside the plane and closer to the camera, whereas midway along the major axis the robot was approximately 0.2 cm further from the camera. The robot also rotated the object ~5° about a vertical axis passing through the robot endpoint. The object was affixed to the robot endpoint at marker D, so this rotation caused markers A, B and C to move in all three dimensions, while D moved only along the ellipse of the endpoint path. We exploited the fact that the path of D was nearly planar to make D the seeding marker for reconstruction.

In case A we collected images with a commercially available multi-camera 3D system (MotionAnalysis™ Corp., Santa Rosa, Calif.). Two cameras (Cohu 4915, 60 frames/s) were placed within 2 m of the object and their optical axes were 42° apart. Barrel distortions were avoided by positioning the cameras so the object did not appear near the edges of the video frames. The optical axis of camera 1 was aligned by eye so it was parallel to a Z direction defined below. Although unnecessary in general, we did this so we could use the simplified reconstruction formulas.

We compared the 3D reconstruction obtained using the two-camera commercial system with that obtained using our algorithm and camera 1 alone. We also verified that 3D reconstruction was necessary by comparing the results with a 2D reconstruction obtained using camera 1. In all three reconstructions we used the same set of images recorded with camera 1. We compared three geometric aspects designated by the markers, length AD, angle BAD, and angle CDB, which were determined from 3D reconstructions of the marker positions in the 3D reconstructions and straight from the images in the 2D reconstruction. We compared geometric aspects rather than positions because comparisons among dynamic positions could not reveal which, if any, of the methods was more accurate. The fixed geometry of the object, on the other hand, provided a known reference.

We calibrated both cameras for use with the commercial reconstruction software by acquiring images of a calibration cube of markers. The orientation of the cube defined a 3D coordinate system in the object workspace. The system software (MotionAnalysis™ Eva 6.0) used images from both cameras to reconstruct the 3D positions of the markers for each image frame (60 frames/s).

For reconstruction with our algorithm we defined a 3D coordinate system based on the robot path. Since the robot endpoint moved in an elliptical path that was nearly contained in a vertical plane (±0.2 cm, see above), we defined our Z direction normal to this plane and Z=0 in this plane. Then, since D was affixed to the robot endpoint, we assumed that D was positioned at Z=0 throughout the path. Thus D served as the seeding marker for the reconstructions. We defined the X and Y directions as the horizontal and vertical directions in the Z=0 plane, respectively.

We calibrated camera 1 for reconstruction with our algorithm. Briefly, we recorded 12 still images of a planar grid of markers. The grid was oriented normal to the Z direction and positioned along Z in 1 cm increments throughout the object workspace, and one image was recorded at Z=0 (defined by the robot path). These data allowed us to determine the location of the image plane origin, o, and to determine the reconstruction formulas described in the results.

FIGS. 10A–10D illustrate calibration and dilation formulas. (A) (case A) and (B) (case B): Actual (X, Y) positions of grid markers in space (x) superimposed on those predicted by the dilation formulas (filled circles). The dilation formulas were applied to the image data superimposed in C (case A) and D (case B). C and D show 12 images of a grid of markers that were recorded with the grid at various Z positions (depths). The (X, Y) positions of the markers in space were held constant for all 12 images, but their u–v locations in the images changed (C and D) because the Z position of the grid changed. (C) (case A) and (D) (case B): Superimposed calibration grid images. The marker images converge to a point as the calibration grid is moved away from the camera along the Z direction. This point is defined as the image plane origin, o. The larger points in D are from the calibration grid image acquired with the grid nearest to the camera.

We used the algorithm to reconstruct the 3D positions of the markers from four known distances, DC, CB, BA, and AD, and the image data from each video frame (60 frames/s). First, we used the commercial system to determine the locations of the marker centroids in each frame. The system provided locations in terms of coordinates referenced from the lower left corner of the frame, and we coverted these locations into the image plane $\{o; u, v\}$ coordinate system for our algorithm. With the marker image locations expressed in $\{o; u, v\}$ coordinates, we carried out 3D reconstruction for the individual images.

In each image we started by reconstructing the 3D position of D because D was the 'seeding' marker with the known Z position, $Z_D=0$. We computed the X and Y positions of D, $(X_D, Y_D)$, given $Z_D$ and the location of D in the image in $\{o; u, v\}$ coordinates, $(u_D, v_D)$. With $(X_D, Y_D, Z_D)$ determined we computed the Z position of C, $Z_C$, given its image location, $(u_C, v_C)$, the 3D position of D, $(X_D, Y_D, Z_D)$, and the distance between D and C on the object, $\Delta_{DC}$. Then we determined the $X_C$ and $Y_C$. We worked from C to B in a similar manner, and so on along the chain of markers D-C-B-A-D. We compared the initial 3D position of D to that determined by working around the chain D-C-B-A-D to examine the error introduced by the bootstrapping nature of the reconstruction algorithm.

We also determined the geometric aspects designated by the markers after reconstructing along the chain D-C-B-A. For example, in examining the angle formed by markers BAD, we used the 3D position of A determined by working along the chain D-C-B-A and the 3D position of B from working along D-C-B. We could have determined the position of A directly from the position of D and distance DA, and likewise the position of B directly from D and DB. However, in most circumstances the object in question will not be completely rigid, and reconstructing along the chain D-C-B-A better simulated a typical application. (Note also that in reconstructing length AD we used the position of A determined by working along D-C-B-A and compared it with D.)

In the 2D reconstruction we scaled the video frames so relative locations of markers positioned in the Z=0 plane were separated by correct distances. (The relative locations of markers positioned outside the Z=0 plane were distorted.)

Figure 9A:
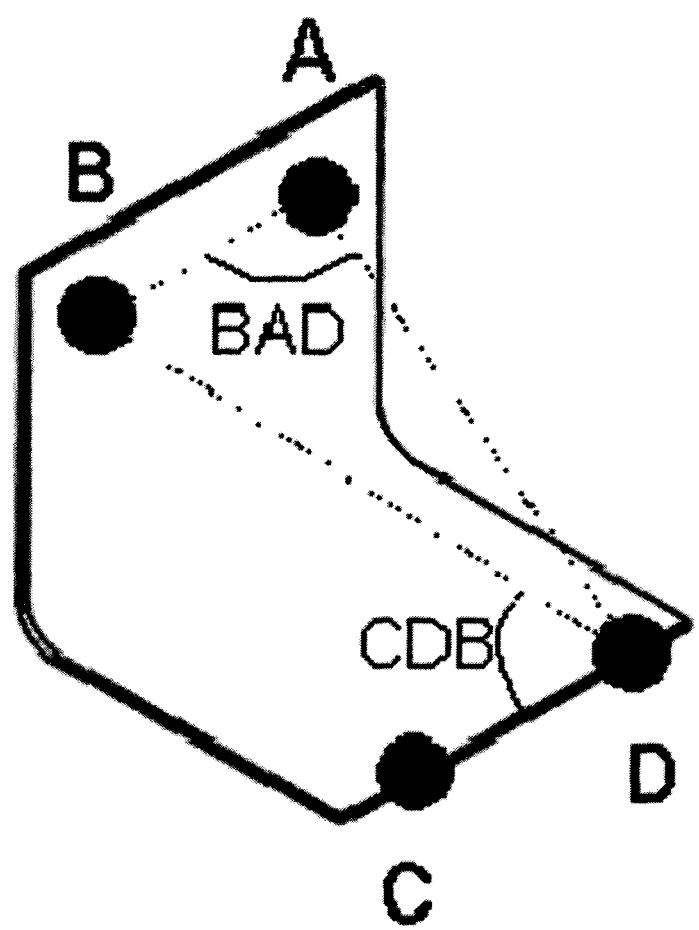
FIGS. 9A–9D illustrate test objects and subjects.
Figure 9B:
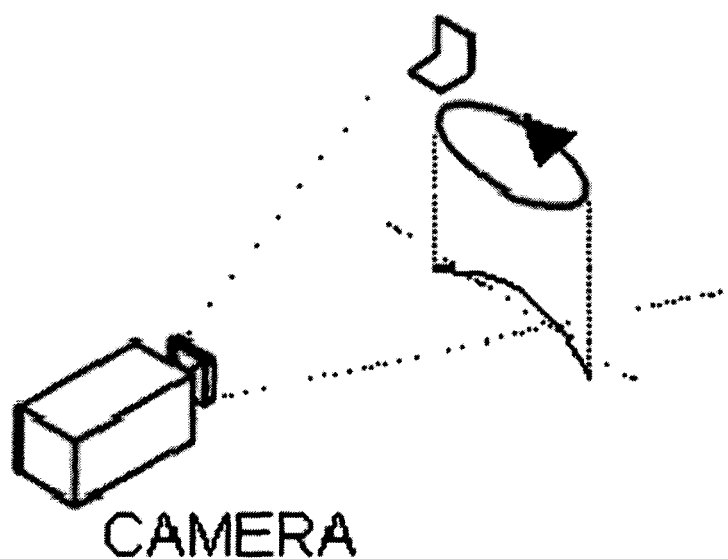
Figure 9C:
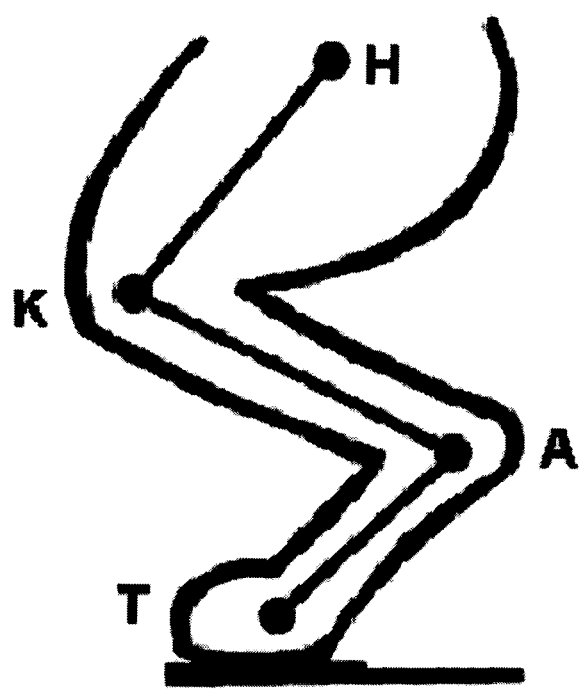
Figure 9D:
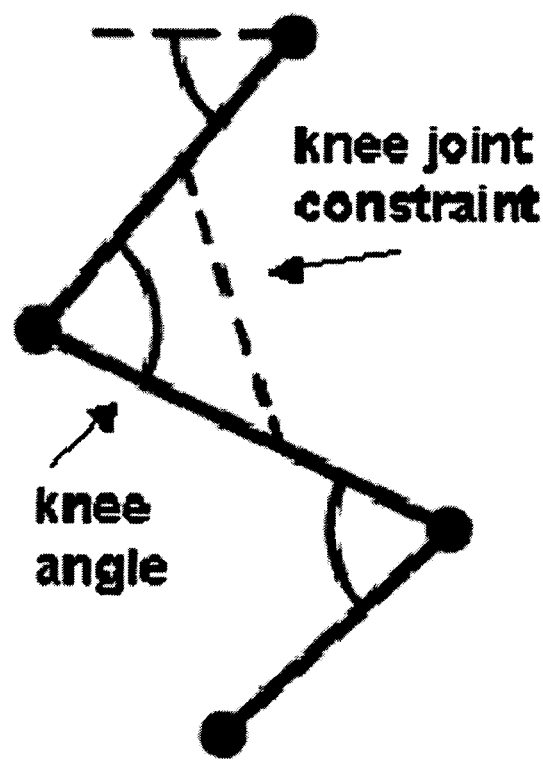
Figure 10A:
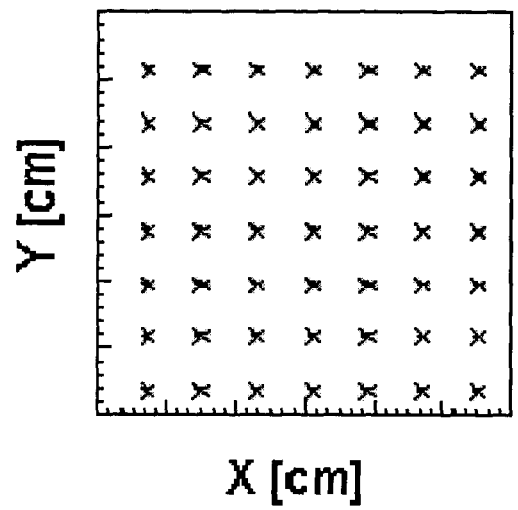
FIGS. 10A–10D illustrate calibration and dilation formulas, according to various embodiments of the present subject matter.
Figure 10B:
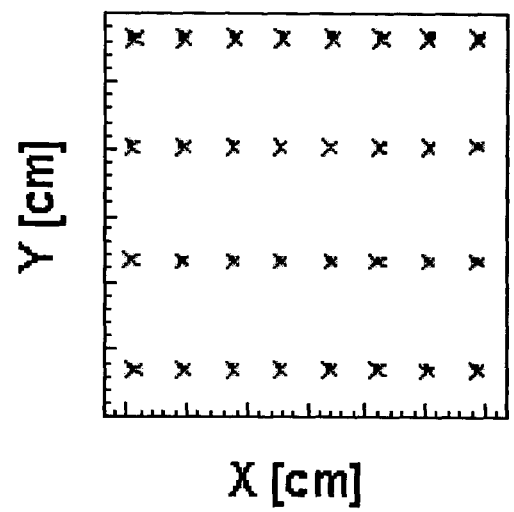
Figure 10C:
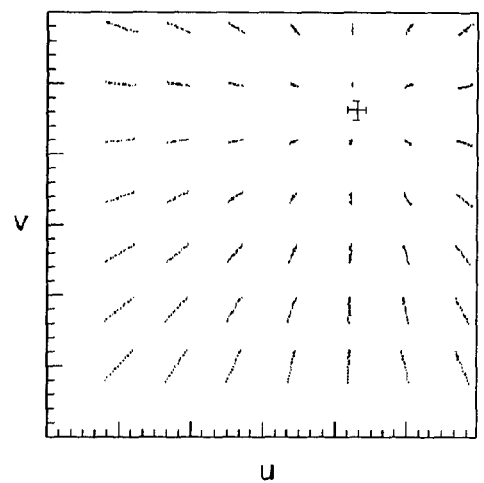
Figure 10D:
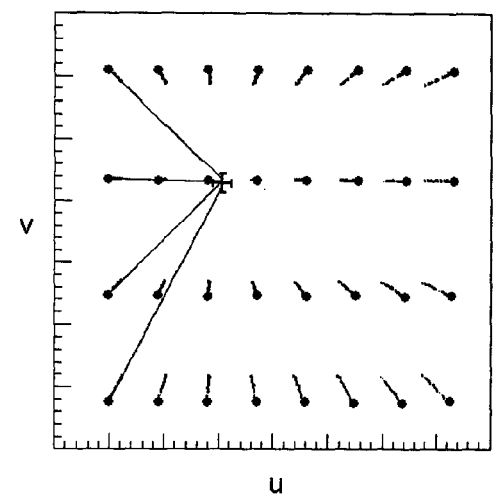

The second test for our algorithm, case B, involved reconstructing the 3D geometry of a cat hindlimb (FIG. 9C). This case presented an object with a changing geometry that consisted of a set of linked rigid segments. We used video data generated by Bosco et al. (2000) for the reconstruction. They used the same robot to move the animal's foot through 2D paths that simulated the locomotion step cycle of a cat (Bosco and Poppele, 1999). In their experiment the toe was affixed to the robot endpoint with a Velcro strip glued to the toe pad, and the pelvis was held in place with pins at the iliac crests (FIG. 9D). Markers were placed on the toe (T), ankle (A), knee (K) and hip (H) to describe limb geometry. In the experimental condition we analyzed the knee joint angle was fixed by a rigid constraint that confined knee angle motion to a few degrees. The constraint was a Plexiglas strip attached to bone pins in the femur and tibia (Bosco et al., 2000). The distances between adjacent markers (i.e. T-A, A-K, and K-H) were measured prior to imaging and were available for 3D reconstruction. As in case A, we defined the Z direction normal to a vertical pane defined by the robot path, Z=0, and the X and Y directions as the horizontal and vertical directions in this plane, respectively. The toe was affixed to the robot and served as the seeding marker at Z=0 for reconstruction.

In this case image data was acquired with a single CCD TV camera (Javelin Newchip™ model 7242, 60 frames/s), and marker centroids were located in 2D video frames using a MotionAnalysis model V100 system operating in a 2D mode. The camera was positioned in a manner similar to that described in case A. Barrel distortion was avoided by ensuring object images did not appear near the edges of the video frame and the optical axis of the camera was parallel to the Z direction (aligned by eye). Therefore, we performed 3D reconstruction with our algorithm in this case exactly as described in case A.

Some of the variability in the reconstructions was due to variability in determining locations of marker centroids in the video frames. We estimated this variability as an RMS error for the two systems we used. We did this by acquiring 30 images of a grid of markers, and computing the square root of the mean of the differences between the average locations and those in each frame.

We used the algorithm for 3D reconstruction with two different imaging systems. In both cases, we followed the calibration protocol to determine realizations for the general reconstruction formulas, and also to determine the image plane coordinate system ({o; u, v}).

We acquired the calibration images superimposed for case A and for case B. The + in each of these figures denotes the location of the image plane origin, o, for the {o; u, v} coordinate system used by the algorithm. In both cases the u and v directions in the image plane were the horizontal and vertical, respectively, because we selected the X and Y directions in space as the horizontal and vertical, respectively.

We determined realizations of Equation 1, the 'dilation formulas', to model the optics of the camera, i.e. to model the camera lines of sight. They provided the (X, Y) position of a marker in space given its (u, v) location in an image and its Z position in space. The (u, v) location specified a line of sight, and the Z position specified X and Y within this line of sight. In both cases A and B the optical axis of the camera was parallel to the Z direction, so we were able to use the parameterized dilation formulas derived for that alignment. There were two parameters—a and b—that we determined from the calibration data. In both cases a=0.01 and b=0.99 cm. Thus the realizations were:

$$X=u(0.01Z+0.99) \tag{22}$$

$$Y=v(0.01Z+0.99) \tag{23}$$

The predicted positions (dots) are superimposed on actual positions (crosses). In each case the predictions were generated from 12 calibration images, which are shown in for cases A and B, respectively. The images were of a planar grid of markers acquired with the grid at a different Z position in space (1 cm increments along Z). Although the Z position was changed, the X-Y position of the grid was held fixed (to within ~±0.2 cm), so in both cases the (X, Y) position of each marker was essentially the same in all 12 images. Therefore the same set of actual (X, Y) positions applied for all 12 images. (Note that there are 12 dots—one for each Z position of the grid—associated with each cross in the figures).

The RMS radial error between the actual (X, Y) marker positions and those predicted from all 12 images was 0.09 cm (0.2 cm maximum) in case A and 0.13 cm (0.3 cm maximum) in case B. Approximately half of this error was due to variability of the system used to determine marker centroid locations in the images. The system introduced a RMS variability of 0.061 cm in case A and 0.05 cm in case B. We assumed that the remaining half of the estimation error, ~0.05 cm RMS, was due to small errors in the X-Y position of the grid when its Z position was changed. Given that we designated (X, Y) positions with 0.6 cm diameter flat markers separated by ≧4.0 cm, the ~0.1 cm errors we encountered in estimating these positions suggested that the above provided equations effectively modeled the camera lines of sight.

The final reconstruction formula realized was Equation 3 and its solution. Equation 3 was a modified 3D Euclidean distance formula that accounted for the camera optics by replacing the X and Y coordinates with their dilation formula analogues. As discussed above we substitute the parameterized dilation formulas used here, Equations 23 (7) and 24 (8), for the generalized dilation formulas appearing in Equation 3, and solve the resulting equation for the unknown, $Z_2$ in this case. The parameterized solution is Equation 10. The solution for the realization of Equation 3 was $$Z_2 = \frac{Z_1 + \alpha \pm \sqrt{(\alpha+Z_1)^2 - \beta(\chi - \Delta_{1,2}^2 + Z_1^2)}}{\beta}. \tag{24}$$

where $\alpha = [0.01](X_1 u_2 - [0.99]u_2^2 + Y_1 v_2 - [0.99]v_2^2)$ $\beta = 1 + [0.01]^2(u_2^2 + v_2^2)$ $\chi = X_1^2 - 2[0.99]X_1 u_2 + Y_1^2 - 2[0.99]Y_1 v_2 + [0.99]^2(u_2^2 + v_2^2)$ Equation 24 was the backbone of the 3D reconstruction algorithm. We used it to compute the Z coordinate of a second marker, $Z_2$, given the image location of the second marker, $(u_2, v_2)$, the position in space of a linked marker, $(X_1, Y_1, Z_1)$, and the linkage distance between the two markers, $\Delta_{1,2}$. Once we computed $Z_2$ we used Equations 22 and 23 along with $(u_2, v_2)$ to compute $(X_2, Y_2)$.

The reconstruction in case A involved a rigid object that was moved in space so its geometry in the images changed. In case B, a cat hindlimb was moved, and in this case the geometry of the limb also changed as it was moved. The first case allowed us to assess the accuracy of the reconstruction algorithm against a known and fixed geometry, while the second presented a more general reconstruction application.

We placed markers on the rigid object at positions A, B, C and D. The object was affixed to the robot at marker D and was moved through a 2D elliptic path that was nearly contained in a vertical plane. We selected the Z direction normal to this plane and set Z=0 in this plane, which made the Z coordinate of D essentially constant throughout the path, $Z_D=0$, so we used D as the 'seeding' marker for our 3D reconstruction.

Since our algorithm requires the 3D position of one marker to reconstruct the 3D position of the next, we examined whether cumulative errors became significant by comparing the 3D position of the seeding marker, D, with that reconstructed by working back to D around the chain of markers D-C-B-A-D. We did this for 810 video frames (60 frames/s), or approximately 2½ cycles around the path. The RMS error between the two positions was 0.17 cm (average error 0.16 cm, S.D. 0.071 cm, maximum single frame error 0.41 cm), compared to the 0.1 cm RMS error obtained for static positions. This demonstrated that, at least in this case, bootstrapping did not result in significant magnification of errors.

We compared our 3D reconstruction algorithm with two other methods by collecting images of the moving object with a commercially available multi-camera 3D system. We made comparisons of two angles, BAD and CDB, and one length, AD, over 810 video frames. The comparisons are summarized in Table 1.

TABLE 1

|  | 1 camera, 2-D | 1 camera, algorithm | 2 cameras, 3-D sys. |
|---|---|---|---|
| Length AD = 9.0 cm | | | |
| average [cm] | 7.2 | 8.9 | 9.1 |
| std dev [cm] | 0.3 | 0.043 | 0.040 |
| rms error [cm] | 1.7 | 0.09 | 0.14 |
| Max [cm] | 7.8 | 9.0 | 9.3 |
| Min [cm] | 6.8 | 8.7 | 8.9 |
| max-min [cm] | 1.0 | 0.3 | 0.4 |
| Angle BAD = 93.9 deg. | | | |
| average [deg] | 124.1 | 96.1 | 87.7 |
| std dev [deg] | 3.3 | 0.62 | 0.69 |
| rms error [deg] | 30.3 | 2.23 | 6.23 |
| max [deg] | 130.7 | 97.7 | 91.7 |
| min [deg] | 119.1 | 94.6 | 85.1 |
| max-min [deg] | 11.6 | 3.1 | 6.6 |
| Angle CDB = 56.0 deg. | | | |
| average [deg] | 77.6 | 55.2 | 57.1 |
| std dev [deg] | 1.7 | 0.24 | 0.31 |
| rms error [deg] | 21.7 | 0.85 | 1.14 |
| max [deg] | 80.8 | 55.7 | 58.6 |
| min [deg] | 75.1 | 54.6 | 55.3 |
| max-min [deg] | 5.6 | 1.1 | 3.4 |

Geometric aspects determined directly from the 2D images were in poor agreement with those of the object, and furthermore, they varied as the object moved, even though the object was rigid. Both errors occurred because the object markers were at different depths from the camera. The same aspects determined using our algorithm and the commercially available 3D system were both close to those of the object. Our algorithm performed better than the commercial system (3D) in terms of RMS error for all three aspects considered. Although unlikely, this could have resulted from errors in measuring all three aspects on the object. However, the object was rigid, and our algorithm also yielded smaller ranges for all three aspects. Furthermore, our algorithm yielded smaller standard deviations for two of the three aspects. Thus, our algorithm seemed to provide a more consistent reconstruction from frame to frame. It should be noted that the commercial system generated obviously poor estimates of object geometry for about 5% of the video frames, which were removed and interpolated from surrounding data. No such filtering was performed on the reconstruction provided by our algorithm. Furthermore, when we used our algorithm we determined all three aspects from 3D positions that were reconstructed by working straight along the chain D-C-B-A. For example, if we needed the 3D position of A, we used the position computed by working along D-C-B-A, rather than, say, shortcutting along D-A. This demonstrated once again that the bootstrapping nature of the reconstruction did not introduce significantly large errors.

The cat hindlimb presented a case where the geometry of the object varied as it moved. In their experiment a robot moved an anesthetized animal's foot passively through a simulation step cycle. We chose a case where the knee joint was constrained by means of a rigid plastic bar attached to bone pins in the femur and tibia. The constraint was designed to maintain the knee angle fixed to within a few degrees. Although the knee angle was constrained, the whole limb was not: the ankle and knee markers both made significant movements along all three dimensions in space, globally and relative to each other. Furthermore, the knee angle constraint imposed no direct restrictions on how the ankle moved, and the ankle position was used to compute the knee angle. Working with the fixed angle allowed us to compare the reconstructed marker positions with a known aspect of the limb geometry.

We determined knee joint angles, i.e. the angles formed by markers AKH, for about 1½ cycles of a simulated slow walk, or about 425 video frames. The knee angle in the 2D video ranged from 110 to 140° and never matched the actual angle, which was about 100°. When we computed the knee angle after first reconstructing the 3D positions of the markers, it remained within ±2.4° of 99.6°.

We used the rigid object data to examine the effects of two possible sources of error on reconstruction accuracy: linkage distance measurement errors and seeding marker Z position errors. We tested these because they are sources of error that are not present in most multi-camera methods. We checked their effects on reconstructed lengths, angles and positions.

We found that errors in the Z position of the seeding marker had little effect on reconstruction accuracy. Of course, shifting the seeding Z position caused a shift in the Z positions of all the other markers, but their relative positions changed little. One of the worst cases we encountered involved object angle CDB (FIG. 9A). It measured 56° on the object and after reconstruction was 55.2° average, S.D. 0.24°. Introducing a ±1 cm error in the seeding marker Z position, which was about 10–20% of a linkage distance, resulted in only an additional ±1° error.

On the other hand, we found that the method was sensitive to linkage distance measurements. For example, introducing an 11% error in length CB (±1 cm for a 9 cm linkage) resulted in a ±5° error in reconstructing angle CBD. The error caused the position of C to change little along the X and Y directions (<0.5 cm typically), but along the Z direction (depth) the position of C changed by more than 10% of the linkage distance (>±1 cm) in many of the images. The distance between C and D was off by 10% on average (0.6 cm average error in a 5.8 cm linkage). Introducing errors in other linkage distances had similar effects.

The single-camera method performed as well as a commercially available 3D reconstruction system with 2 fixed cameras. Since our algorithm uses knowledge of linkage distances to determine information that is typically provided by a second camera, it is less general than multi-camera methods. Nevertheless it has a number of advantages including lower cost and reduced complexity. Also, set-up for this method is simple because neither camera position nor optical alignment need conform to any specifications. Thus the method may be useful in situations where environmental constraints limit the space available for clear camera views of the object.

The main advantage of the multi-camera DLT method over single-camera methods is the DLT method requires nothing in addition to the images for 3D reconstruction. The 3D position of a lone marker is determined by combining information from images acquired from different vantage points. Also, implementing the DLT method is simple because calibration amounts to acquiring images of at least six fixed points at known positions in space. A computer program is used to calculate parameters that eliminate the need for additional measurements by accounting for the position and orientation of the cameras, while also providing linear corrections for lens distortions. Thus, given the overall quality of the DLT method, multiple cameras are often employed to record 3D geometry. Nevertheless, our method can serve as a comparable substitute when cost or environmental factors impose constraints.

Our method does have two possible sources of error that are not present in standard multi-camera 3D methods, however. These can arise from errors in measuring distances between linked markers or from errors in determining the Z position of the seeding marker. In our case, the reconstruction algorithm was robust with respect to the latter. The worst-case we found was an additional ±1° error in reconstructing angle CDB from a ±1 cm error in the Z position of the seeding marker, which was 10–20% of the object size. In this case the imaging region was 30×30 cm$^2$ along X and Y at a distance of 1.5 m from the camera along Z. Consequently, all the camera lines of sight were nearly normal to the X-Y planes, and relatively large changes in Z position were required to induce significant changes in image locations. The predominant effect of the seeding marker Z error was a shift in the reconstructed Z positions of all markers by the error.

Although the camera lines of sight were near normal to the X-Y planes, this did not mean the optics of the camera could be ignored. For example, if we ignored optics by assuming all lines of sight were normal to the imaging plane (and therefore parallel to each other), then parameter a would be zero so Z position and image location would be unrelated. In such a case, the calibration images shown in the figures would be scaled versions of the predicted (X, Y) positions of the grid markers, which we know is wrong since their actual (X, Y) positions were constant throughout the calibration.

We examined this issue further by reconstructing 3D object geometry while ignoring camera optics. The assumption was the camera lines of sight were parallel to one another and normal to the X-Y planes. We derived the reconstruction equations for this assumption, which is the limiting case as the camera is positioned infinitely far from the object. Those equations are equivalent to the ones we used except with parameter a, which accounts for optics, set to zero. We pursued the issue because in our case parameter $a=0.01$ was small relative to parameter $b=0.99$ (cm), and Z varied only within ±6 cm of $Z=0$ (cm), so the aZ term that accounted for divergent lines of sight in Equation 8, $X=u(aZ+b)$, was always small relative to the scaling parameter, b. When we performed 3D reconstructions without accounting for optics, i.e. with parameter $a=0$, accuracy was compromised. For example, length AD and angle BAD were fixed on the object, and in our 3D reconstruction they varied by 0.26 cm and 3.0°, respectively. When we ignored optics, the values varied by 0.37 cm and 4.5°, respectively, a 50% increase in error. Thus, although the optics parameter was relatively small, it was nonetheless important for an accurate reconstruction.

The second possible source of error is the measurement of linkage distances. For example, an 11% error in length CB (±1 cm for a 9 cm linkage), resulted in a ±5° error in the computed value of angle CDB and caused the Z position of marker C to change by over 11% (more than 1 cm for a 9 cm linkage) in many frames. The large change in Z occurred because the linkage distance error is absorbed by changing the reconstructed position of marker C along the camera line of sight specified by the image of C, $R_C$, and in this case all lines of sight were nearly parallel to the Z direction. Since in the case we examined the linkage between C and B was nearly orthogonal to $R_C$, the position of C had to change along $R_C$ by a distance that was often larger than the error in distance CB. We expect that the method will always be sensitive to linkage distance errors because positions are reconstructed by finding the point along a given line of sight that matches the linkage distance from a previously reconstructed point.

One caveat of the method is the quadratic form of Equation 3. It yields for each reconstructed marker position two Z solutions and consequently, two possible 3D positions. There is no mathematical way around this in our algorithm. Usually though, comparison of the two positions with the next linked marker will prove one position degenerate, because the distance to the next marker will be wrong for one of the two positions. A rough knowledge of the configuration of the object may also resolve the ambiguity. Of course, it is possible to contrive scenarios where both positions for a marker are viable. However, in such cases it may not be necessary to remove the ambiguity. For example, if the marker is needed only to build toward another marker whose position is critical, then either position can be used. A worst-case solution would be to use a second camera just to record a rough estimate of the depth(s) (i.e. in front or behind) of the ambiguous markers(s)—but without fully integrating the second camera with the imaging system. Presumably though, in most cases a simpler more cost effective solution would exist if the problem arose.

A motivation for using 3D imaging instead of 2D is that subtle, yet important aspects of object geometry can be lost when 2D images are used—even when 3D reconstruction appears unnecessary. For example, out of plane rotations of the human hip may result in errant conclusions about gait when 2D imaging is employed. Use of this algorithm could help resolve such issues without the need for additional equipment.

In various embodiments, the present subject matter is used in gait analysis, general limb movement studies, computer facial recognition, 3D dental analysis, and machine vision guided robots. Given the linkage distances of a robot arm, this algorithm could be used in conjunction with a single-camera to provide and accurate estimate of the arm position—without the burden of multiple views of the arm. In various embodiments, the present subject matter is applied to video, kinematics, biomechanics, photogrammetery, cinematography and/or videography. Potential applications range from the very large to the microscopic, where some distances along the object or scene are known. Those of ordinary skill in the art will understand, upon reading and comprehending this disclosure, how to implement the present subject matter in these and other applications.

This disclosure includes several processes and structures. The present invention is not limited to a particular process order or logical arrangement. Although specific embodiments have been illustrated and described herein, it will be appreciated by those of ordinary skill in the art that any arrangement which is calculated to achieve the same purpose may be substituted for the specific embodiments shown. This application is intended to cover adaptations or variations. It is to be understood that the above description is intended to be illustrative, and not restrictive. Combinations of the above embodiments, and other embodiments, will be apparent to those of skill in the art upon reviewing the above description. The scope of the present invention should be determined with reference to the appended claims, along with the full scope of equivalents to which such claims are entitled.

What is claimed is:

1. A method of using a single camera to determine three dimensional (3D) position information for a designated point on an object, the method comprising:
    determining a linkage distance between the designated point and a seeding point on the object;
    defining a 3D viewfield coordinate system having orthogonal axes in the viewfield of the camera and designating the coordinate axis most nearly parallel to the optical axis of the camera as the depth axis;
    mapping locations in the image plane to unique lines of sight in the viewfield of the camera, wherein a coordinate along the depth axis determines a unique position along a particular line of sight mapped from a particular location in the image plane;
    determining the position of the seeding point in the viewfield coordinate system;
    determining the location of the image of the designated point in the image plane; and
    computing the position of the designated point along the depth axis as a function of the position of the seeding point along the depth axis, the linkage distance between the designated point and the seeding point, and the location of the image of the designated point in the image plane.

2. The method of claim 1, further comprising aligning the depth axis of the viewfield coordinate system to be approximately collinear with the camera's optical axis.

3. The method of claim 2, wherein mapping locations in the image plane comprises:
    orienting a calibration grid having a number of co-planar markers to be orthogonal to the depth axis of the viewfield coordinate system such that each marker produces an image on the image plane, each marker having a known position relative to at least one other marker in the grid;
    acquiring images of the calibration grid at a number of positions along the depth axis; and
    for each image that is acquired, determining the coordinate position of the calibration grid along the depth axis.

4. The method of claim 1, wherein computing the position of the designated point comprises solving a single equation having a single unknown.

5. The method of claim 4, wherein solving a single equation having a single unknown comprises selecting from among two solutions.

6. The method of claim 5, wherein selecting from among two solutions comprises selecting a real solution from among a real and an imaginary solution.

7. The method of claim 1, wherein determining the position of the seeding point in the viewfield coordinate system comprises:
    providing one or more triplets of designated points on the object, each triplet including a triangle of designated points between which the linkage distances are known, wherein the linkage distance from the seeding point to at least one of the designated points in the one or more triplets is known;
    solving a system of three equations, each equation providing one coordinate of each triplet point; and
    for each triplet that is provided, determining one spatial coordinate of the seeding point.

8. The method of claim 7 wherein the seeding point is one of the designated points in the one or more triplets.

9. The method of claim 1, wherein determining the position of the seeding point in the viewfield coordinate system comprises:
    determining the position of the seeding point along the depth axis;
    determining the location of the image of the seeding point in the image plane; and
    computing the 3D position of the seeding point as a function of the depth coordinate of the seeding point and the location of the image of the seeding point in the image plane.

10. The method of claim 1, further comprising computing the 3D position of the designated point as a function of the depth coordinate of the designated point and the location of the image of the designated point in the image plane.

11. The method of claim 1, wherein the object is an inventory item.

12. The method of claim 1, wherein the object includes teeth.

13. The method of claim 1, wherein the object is an animal.

14. The method of claim 1, wherein the object is a person.

15. A three dimension (3D) video imaging system comprising:
    a camera; and
    a computational system comprising a processor and a readable medium having executable program instructions stored thereon that when executed by the processor cause the processor to:
        determine a linkage distance between a designated point on an object and a seeding point on the object;
        define a 3D viewfield coordinate system having orthogonal axes in the viewfield of the camera and designate the coordinate axis most nearly parallel to the optical axis of the camera as the depth axis;
        map locations in the image plane to unique lines of sight in the viewfield of the camera, wherein a coordinate on the depth axis determines a unique position along a particular line of sight mapped from a particular location in the image plane;

determine the position of the seeding point in the viewfield coordinate system;

determine the location of the image of the designated point in the image plane; and compute the position of the designated point along the depth axis as a function of the position of the seeding point along the depth axis, the linkage distance between the designated point and the seeding point, and the location of the image of the designated point in the image plane.

16. The method of claim 15, wherein the depth axis is aligned to be approximately collinear with the camera's optical axis.

17. The system of claim 16, wherein the image plane lies between a focal point of the camera and the object whose image is being received in the image plane.

18. The system of claim 15, further comprising a calibration grid to determine a mapping from locations in the image plane to unique lines of sight in the viewfield of the camera such that a coordinate on the depth axis determines a unique position along a particular line of sight mapped from a particular location in the image plane, wherein the calibration grid includes a number of co-planar markers, each marker being linked by a known distance to at least one other marker in the grid, wherein the grid may be oriented to be orthogonal to the depth axis of the viewfield coordinate system such that a number of the markers in the calibration grid produce images on the image plane.

19. A method of recording three dimensional (3D) movement of an object using a single camera, the method comprising:

mapping locations in an image plane of the camera to unique lines of sight in the viewfield of the camera, wherein a coordinate on a depth axis determines a unique position along a particular line of sight mapped from a particular location in the image plane, wherein the depth axis is an axis of an orthogonal coordinate system defined in the viewfield of the camera, the depth axis being the axis of the coordinate system most nearly parallel to the optical axis of the camera;

determining the 3D positions of a plurality of designated points on the object at a second position relative to the positions of the designated points at a first position, each of the plurality of designated points having a known linkage distance to at least one other point in the plurality of points; and modeling the object based on the relative positions of the designated points in the first and the second positions.

20. The method of claim 19, wherein the object is a product that is being manufactured.

21. The method of claim 19, wherein the object is an inventory item.

22. The method of claim 19, wherein a robot uses the determined 3D position of the object to determine the orientation and size of the object.

23. The method of claim 19, wherein the object is a robot, and the robot uses the computed 3D positions of the designated points to determine the 3D position of the robot's movable elements.

24. The method of claim 19, wherein the object includes teeth.

25. The method of claim 19, wherein the object is an animal.

26. The method of claim 25, wherein the plurality of designated points are identified and positioned so as to record the animal's gait.

27. The method of claim 25, wherein the plurality of designated points are identified and positioned so as to identify the animal.

28. The method of claim 19, wherein the object is a person.

29. The method of claim 28, wherein the plurality of designated points are identified and positioned so as to record the person's gait.

30. The method of claim 28, wherein the plurality of designated points are identified and positioned so as to identify the person.

* * * * *